United States Patent
Yoshizawa

(10) Patent No.: US 10,609,245 B2
(45) Date of Patent: Mar. 31, 2020

(54) IMAGE READING APPARATUS AND IMAGE DATA GENERATION METHOD

(71) Applicant: SEIKO EPSON CORPORATION, Tokyo (JP)

(72) Inventor: Motoki Yoshizawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/293,785

(22) Filed: Mar. 6, 2019

(65) Prior Publication Data
US 2019/0281181 A1    Sep. 12, 2019

(30) Foreign Application Priority Data

Mar. 8, 2018    (JP) .................. 2018-041552
Oct. 9, 2018    (JP) .................. 2018-190643

(51) Int. Cl.
*H04N 1/10*    (2006.01)
*H04N 1/00*    (2006.01)
*H04N 1/04*    (2006.01)
*H04N 1/19*    (2006.01)

(52) U.S. Cl.
CPC ....... *H04N 1/1043* (2013.01); *H04N 1/00676* (2013.01); *H04N 1/00745* (2013.01); *H04N 1/0402* (2013.01); *H04N 1/19* (2013.01); *H04N 2201/0414* (2013.01)

(58) Field of Classification Search
CPC ...... H04N 1/1043; H04N 1/19; H04N 1/0402; H04N 1/00745; H04N 1/00676; H04N 2201/0414

USPC ........................................... 358/1.15
See application file for complete search history.

(56) References Cited

U.S. PATENT DOCUMENTS

2004/0223058 A1* 11/2004 Richter .............. H04N 5/77
                                                              348/207.1
2009/0256908 A1* 10/2009 Chen ............. G08B 13/19641
                                                              348/143

FOREIGN PATENT DOCUMENTS

EP         2622838 B1    7/2015
JP         2016-127295 A  7/2016

OTHER PUBLICATIONS

The Extended European Search Report for the corresponding European Patent Application No. 19161395.9 dated Jul 12, 2019.

* cited by examiner

*Primary Examiner* — Tammy Paige Goddard
*Assistant Examiner* — Darryl V Dottin
(74) *Attorney, Agent, or Firm* — Global IP Counselors, LLP

(57) ABSTRACT

An image reading apparatus includes a first sensor, a second sensor, a third sensor, a first processor that generates a first merge image based on first image data acquired by reading by the first sensor and second image data acquired by reading by the second sensor, and a second processor that generates a second merge image based on the second image data and third image data acquired by reading by the third sensor, and generates an output image by performing a linking process on the first merge image and the second merge image.

9 Claims, 29 Drawing Sheets

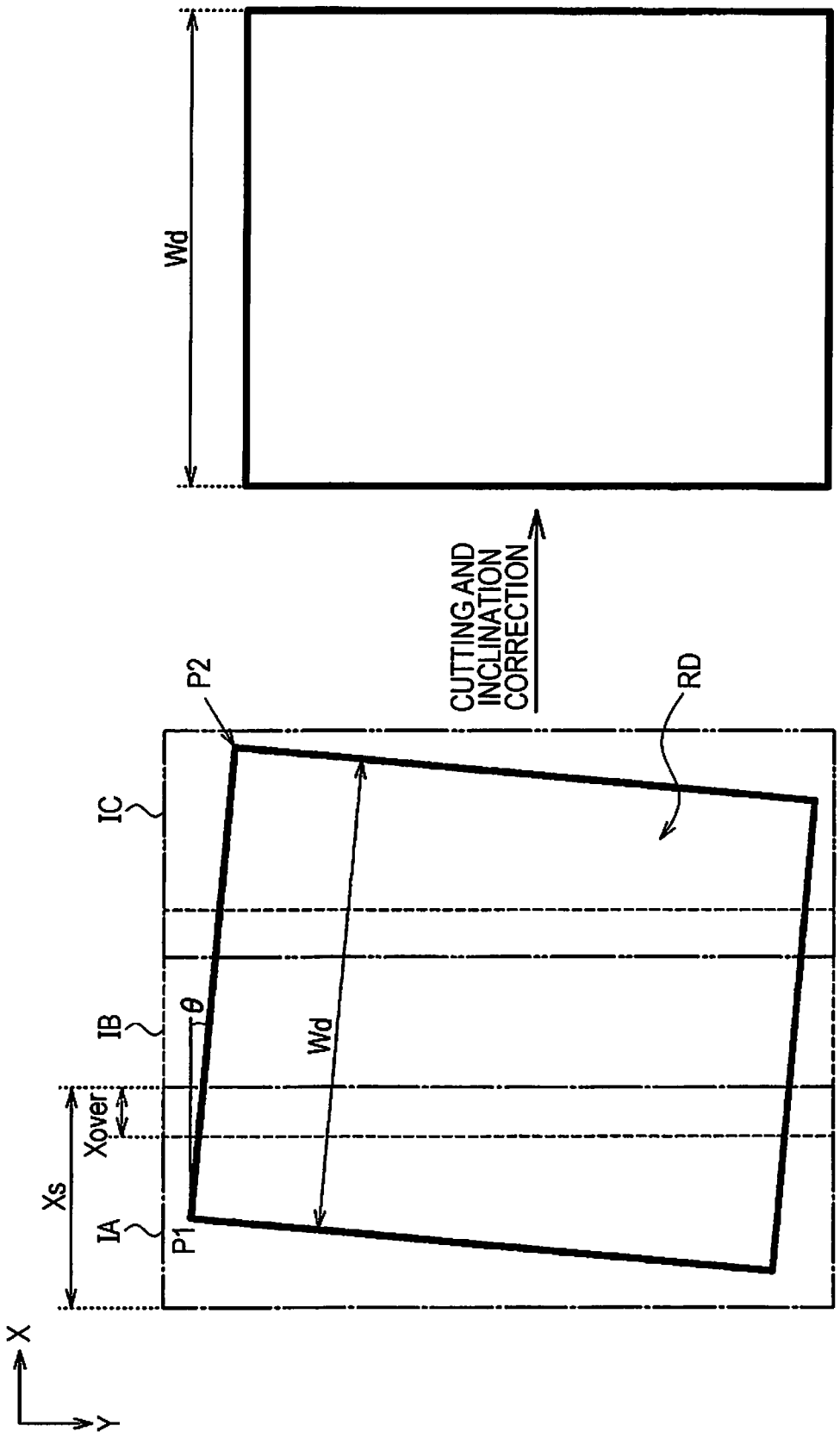

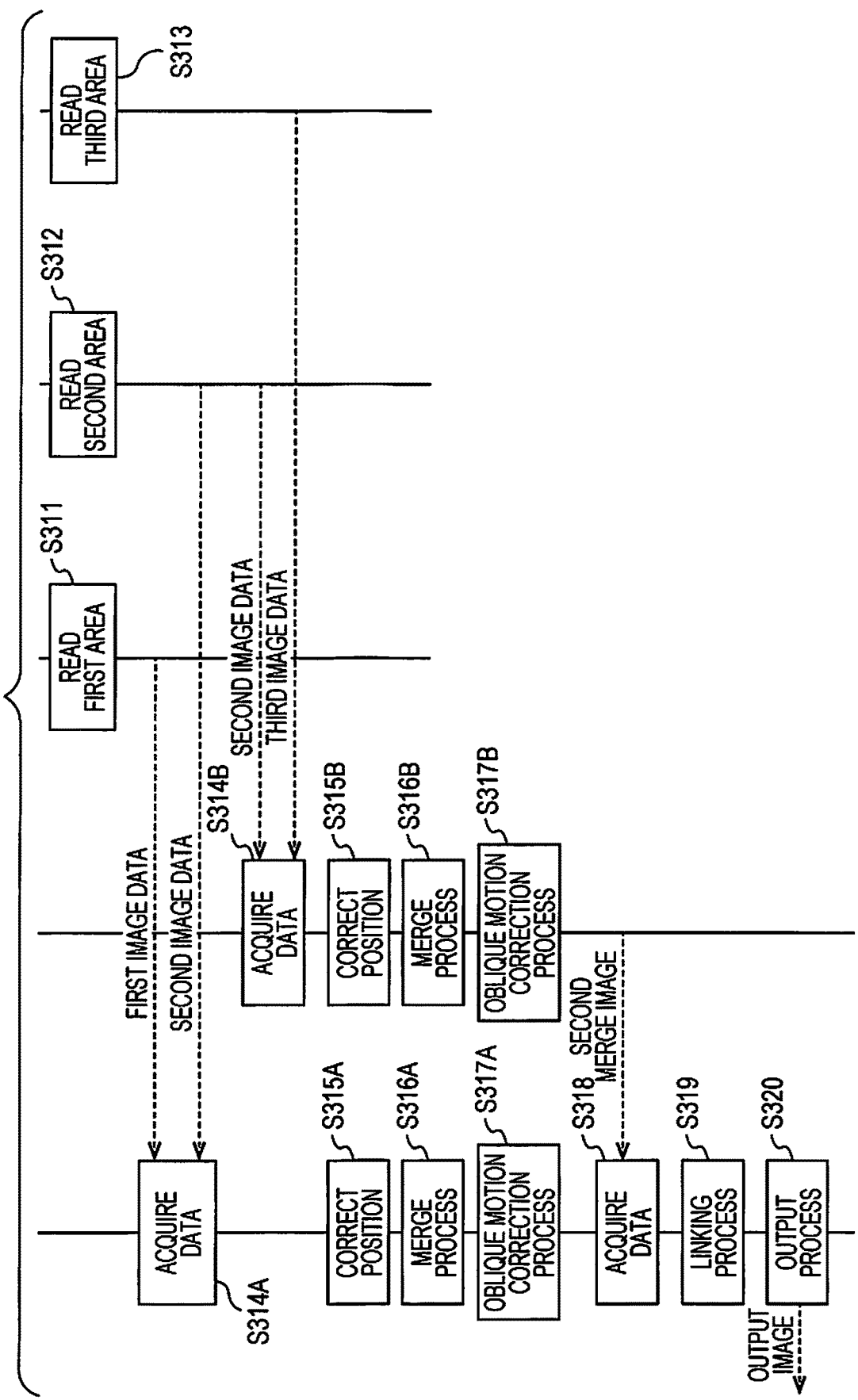

IMAGE READING APPARATUS AND IMAGE DATA GENERATION METHOD

BACKGROUND

1. Technical Field

The prevent invention relates to an image reading apparatus, an image data generation method, and the like.

2. Related Art

In the related art, an image reading apparatus that reads an original document having a larger width than that in the case of using one image sensor by using a plurality of image sensors is known. For example, a large size original document such as A0 or A1 can be read by combining a plurality of image sensors for A3 size or A4 size. Such an image reading apparatus has an advantage such that manufacturing of the image sensor is easily performed at a low cost, compared to that in the case of using a wide width image sensor.

However, individual differences are present among the plurality of image sensors, and the brightness or the tone of the reading result may vary even in the case of reading the same original document. Therefore, the brightness or the tone is adjusted by performing a correction process on the reading result of the plurality of image sensors. For example, JP-A-2016-127295 discloses a method of using a gain and an offset as correction parameters, manipulating the correction parameters such that evaluation values match, and correcting a difference among image sensors.

The correction process and a merge process for image data after the correction process are performed by a processor of the image reading apparatus. In a case where the number of image sensors is greater than or equal to three, the processor needs to receive and process three or more image data from the image sensors since each image sensor outputs a reading result.

However, a processor that has the same number of interfaces (reception port of the image data which is the result of reading by each image sensor) as three or more image sensors is a dedicated processor. Thus, development cost is high.

SUMMARY

According to an aspect of the invention, there is provided an image reading apparatus including a first sensor that reads a first area of an image of a reading target, a second sensor that reads a second area partially overlapping with the first area in the image, a third sensor that reads a third area partially overlapping with the second area in the image, a first processor that performs a first merge process of generating a first merge image including the first area and the second area based on first image data acquired by reading by the first sensor and second image data acquired by reading by the second sensor, and a second processor that performs a second merge process of generating a second merge image including the second area and the third area based on the second image data and third image data acquired by reading by the third sensor. An output image is generated by performing a linking process on the first merge image and the second merge image.

In addition, the image reading apparatus may further include a first analog front end that performs A/D conversion on an analog signal from the first sensor and outputs the first image data which is digital data to the first processor, a second analog front end that performs A/D conversion on an analog signal from the second sensor and outputs the second image data which is digital data to the first processor and the second processor, and a third analog front end that performs A/D conversion on an analog signal from the third sensor and outputs the third image data which is digital data to the second processor.

In addition, in the image reading apparatus, the first processor may generate the first merge image by performing the first merge process of merging the first image data with the second image data based on a reading result acquired by the first sensor reading a first overlap area in which the first area and the second area overlap, and a reading result acquired by reading the first overlap area by the second sensor. The second processor may generate the second merge image by performing the second merge process of merging the second image data with the third image data based on a reading result acquired by the second sensor reading a second overlap area in which the second area and the third area overlap, and a reading result acquired by reading the second overlap area by the third sensor.

In addition, in the image reading apparatus, the first merge process may include a cutting process and an inclination correction process. The second merge process may include the cutting process and the inclination correction process. The linking process may not include the cutting process and the inclination correction process.

In addition, in the image reading apparatus, a detection process for an original document area that is an area in which an original document which is the reading target is read may be performed based on an image into which an output of the first sensor, an output of the second sensor, and an output of the third sensor are merged. Detection of original document width information related to the reading target and detection of inclination angle information may be performed based on the detected original document area. The cutting process and the inclination correction process included in the first merge process and the second merge process may be performed based on the original document width information and the inclination angle information.

In addition, in the image reading apparatus, a process of setting a boundary between a first original document area that is a target of the cutting process and the inclination correction process performed by the first processor in the original document area, and a second original document area that is a target of the cutting process and the inclination correction process performed by the second processor in the original document area may be performed based on the original document width information and the inclination angle information. A determination may be made that an oblique motion error occurs in a case where a determination is made that the set boundary is included in an area corresponding to the first area or the third area.

In addition, in the image reading apparatus, the first processor may acquire the second merge image from the second processor and generate the output image by performing the linking process based on the first merge image and the second merge image.

In addition, the image reading apparatus may further include a third processor that acquires the first merge image from the first processor, acquires the second merge image from the second processor, and generates the output image by performing the linking process based on the first merge image and the second merge image.

According to another aspect of the invention, there is provided an image data generation method using an image reading apparatus including a first sensor that reads a first area of an image of a reading target, a second sensor that reads a second area partially overlapping with the first area in the image, and a third sensor that reads a third area partially overlapping with the second area in the image. The method includes generating a first merge image including the first area and the second area based on first image data acquired by reading by the first sensor and second image data acquired by reading by the second sensor, generating a second merge image including the second area and the third area based on the second image data and third image data acquired by reading by the third sensor, and generating image data of an output image by performing a linking process on the first merge image and the second merge image.

BRIEF DESCRIPTION OF THE DRAWINGS

The invention will be described with reference to the accompanying drawings, wherein like numbers reference like elements.

FIG. 21 is a diagram describing a summary of an oblique motion correction process.

FIGS. 22A and 22B are diagrams describing a flow of reading process of a second embodiment.

DESCRIPTION OF EXEMPLARY EMBODIMENTS

Hereinafter, the present embodiment will be described. The embodiment described below does not unduly limit the content of the invention disclosed in the claims. In addition, not all configurations described in the embodiment are essential constituents of the invention.

1. System Configuration Example

Figure 1:
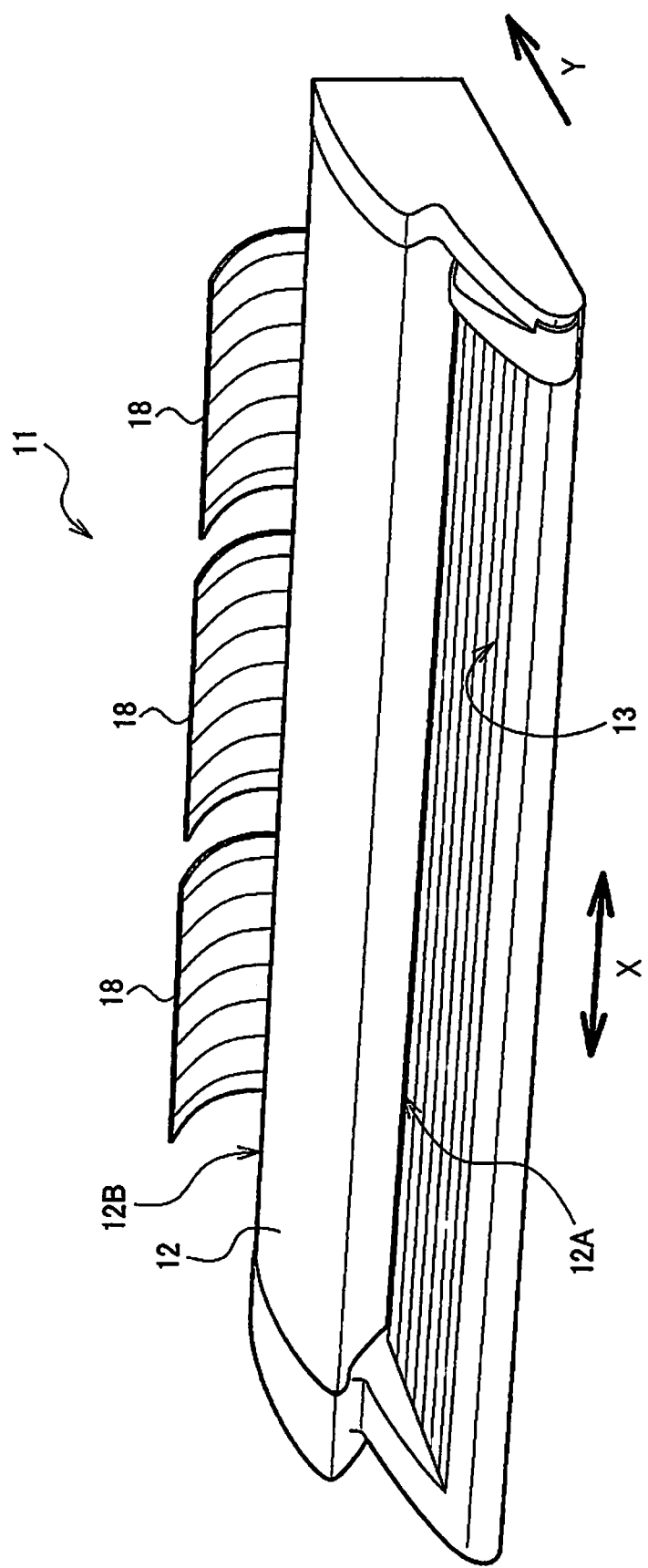
FIG. 1 is a perspective view of an image reading apparatus.

FIG. 1 is a perspective view of an image reading apparatus 11 according to the embodiment. As illustrated in FIG. 1, the image reading apparatus 11 of the embodiment includes a main body 12 and a mounting surface 13 on which an original document D that is an image reading target is mounted (set). In the present embodiment, the reading target of the image reading apparatus 11 is assumed to be a large size original document such as A0 or A1. Thus, the length of the mounting surface 13 in a transport direction Y of the original document D is smaller than the length of the original document D, and the mounting surface 13 is used for mounting the leading edge part of the original document D. The leading edge part of the original document refers to an edge part on a side that is initially read by the image reading apparatus 11.

The original document D mounted on the mounting surface 13 is fed to a feeding port 12A that is open in the front surface part of the main body 12. The fed original document D is transported along a predetermined transport path 32 (refer to FIG. 2) in the main body 12. An image is read at a reading position in the middle of the transport of the original document D. Then, the original document D is discharged from a discharge port 12B that is open in the rear side upper part of the main body 12, and, for example, is transported to the front side of the main body 12 along a discharge guide 18. When the image reading apparatus 11 reads the image of the original document D, a width direction X is set as a main scan direction, and a transport direction Y is set as a subscan direction.

For example, the image reading apparatus 11 illustrated in FIG. 1 is attached and electrically connected to a multifunction peripheral (MFP) by a dedicated attaching jig. In this case, an operation unit of the multifunction peripheral receives an input operation from a user, and a display unit of the multifunction peripheral displays various information to the user. Read data is stored in a storage unit of the multifunction peripheral. The stored data may be used for printing by the multifunction peripheral or may be transmitted to an apparatus such as a PC through a network and used by the transmission destination apparatus. Alternatively, the image reading apparatus 11 of the embodiment may be an apparatus that can operate without connecting to the multifunction peripheral. In this case, for example, the image reading apparatus 11 includes a display unit and an operation unit, not illustrated, and is configured to connectable to an apparatus such as a PC.

Figure 2:
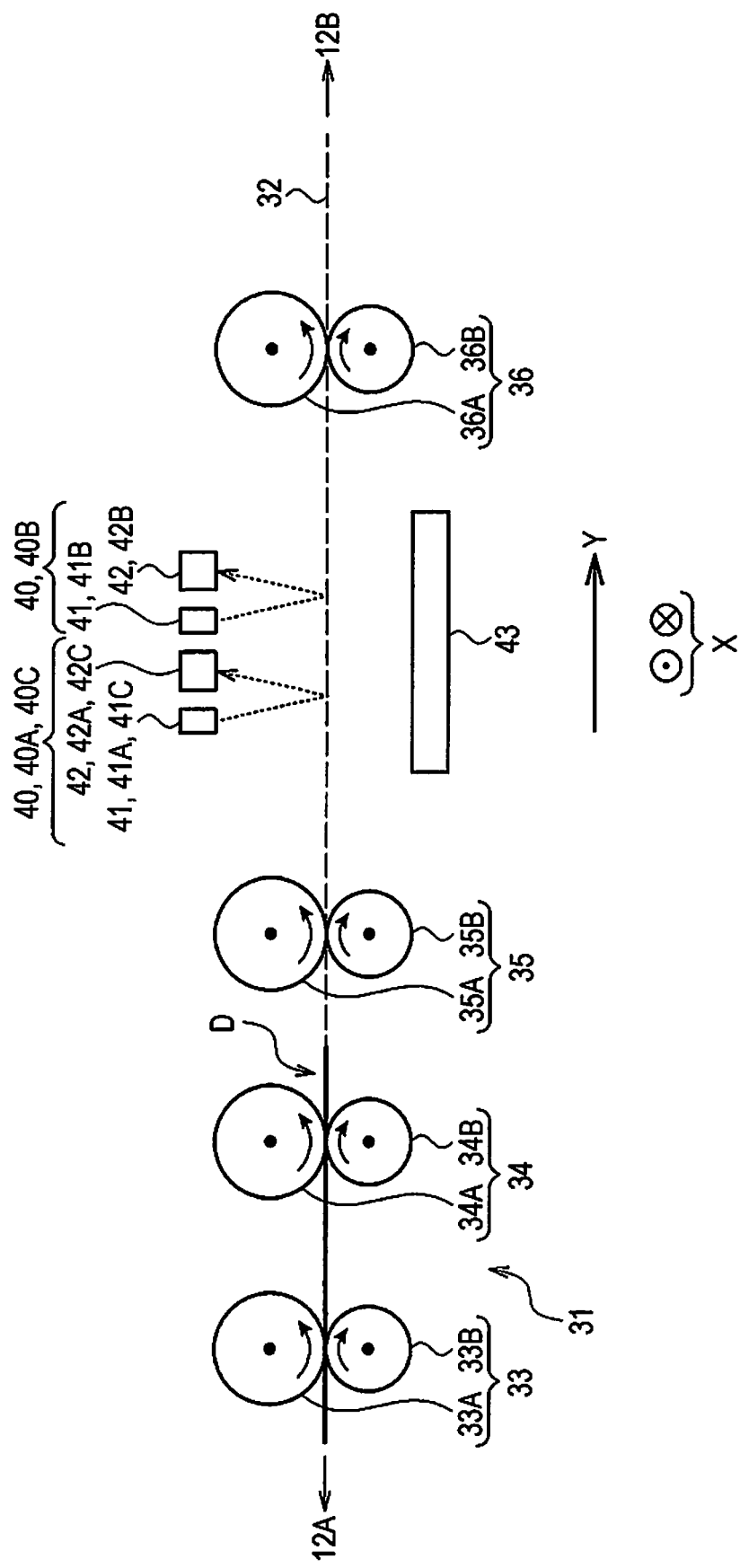
FIG. 2 is a sectional view of a main part of the image reading apparatus.

FIG. 2 is a diagram describing an operation of transporting and reading the original document D and is a diagram illustrating a part of the section of the image reading apparatus 11 in a simplified manner. As illustrated in FIG. 2, a transport mechanism 31 that transports the original document D is disposed in the main body 12 of the image reading apparatus 11. The transport mechanism 31 guides and feeds the original document D mounted on the mounting surface 13 into the main body 12 from the feeding port 12A and transports the fed original document D at a constant transport speed along the transport path 32.

The transport mechanism 31 includes a feeding roller pair 33 that is arranged at a position at the upstream end of the transport path 32 in the main body 12, a feeding roller pair 34 that is arranged on the downstream side of the feeding roller pair 33 in the transport direction, a transport roller pair 35 that is arranged on the upstream side of the reading position of the original document D in the transport direction Y, and a transport roller pair 36 that is arranged on the downstream side of the reading position of the original document D in the transport direction Y.

The feeding roller pairs 33 and 34 are configured with drive rollers 33A and 34A and driven rollers 33B and 34B. In addition, the transport roller pairs 35 and 36 are configured with drive rollers 35A and 36A and driven rollers 35B and 36B. The driven rollers 33B to 36B are rotated together by rotation of the drive rollers 33A to 36A of their respective pairs. Each of the drive rollers 33A to 36A constituting the plurality of roller pairs 33 to 36 is rotationally driven by power of its power source of a transport motor (not illustrated).

As illustrated in FIG. 2, a reading unit 40 is disposed at the reading position in the middle of the transport path 32 that is formed in the main body 12 by the feeding roller pairs 33 and 34 and the transport roller pairs 35 and 36. The reading unit 40 includes a plurality of reading units. FIG. 2 illustrates an example in which the reading unit 40 includes a first reading unit 40A, a second reading unit 40B, and a third reading unit 40C. The reading unit 40 (40A, 40B, and 40C) is configured with a light source 41 (41A, 41B, and 41C) that can radiate light to the original document D during its transport, and an image sensor 42 (42A, 42B, and 42C) that extends in the main scan direction (width direction X). While an example of performing a single side scan is illustrated here, a double side scan of the original document may be configured by disposing the reading units 40 with the transport path 32 interposed therebetween.

The light source 41 is configured with, for example, a light emitting diode (LED) or a fluorescent lamp. The image sensor 42 receives reflected light from reflection of the light emitted from the light source 41 by the original document D or the like, converts the received light into an electric signal, and outputs a pixel signal having a value corresponding to the intensity of received light. The image sensor 42 is, for example, a linear image sensor. The image reading apparatus 11 can perform a color scan and a monochrome scan (gray scale scan). The color scan method includes a method of acquiring pixel signals of RGB colors in order from monochrome image sensors by causing light sources of RGB colors to emit light in order in a time series manner, and a method of including photoelectric conversion elements of RGB colors covered with color filters in an image sensor and acquiring pixel signals of RGB from the photoelectric conversion elements by causing a white light source to emit light. The color scan method may be any of the methods. While an example of disposing the light source 41 for each reading unit 40 is illustrated in FIG. 2, one light source 41 may be shared by a plurality of reading units 40.

The image sensor 42 is, for example, a contact type image sensor in which a plurality of photoelectric conversion elements are arranged in a row in the main scan direction X. Furthermore, the image sensor 42 is specifically an image sensor chip in which a complementary metal oxide semiconductor (CMOS) element is packaged.

Furthermore, a color reference plate 43 is arranged at a position that faces the image sensor 42 with the transport path 32 interposed therebetween. The color reference plate 43 is used for acquiring a white reference value for shading correction. Thus, a white reference plate having white color or a gray reference plate having gray color (ash color) is used as the color reference plate 43. The gray reference plate is used for detecting the position and the area of the original document D based on a difference in color or brightness value between the original document and a background from reading data in which the color reference plate 43 is read as the background (gray background) of the original document.

FIG. 1 and FIG. 2 are one example of the configuration of the image reading apparatus 11. Various modifications can be made to a specific exterior or an internal structure of the image reading apparatus 11. For example, reading may be performed by fixing the original document D and moving the image sensor 42. An oblique motion correction process described below is particularly important in the case of transporting the original document D.

Figure 3:
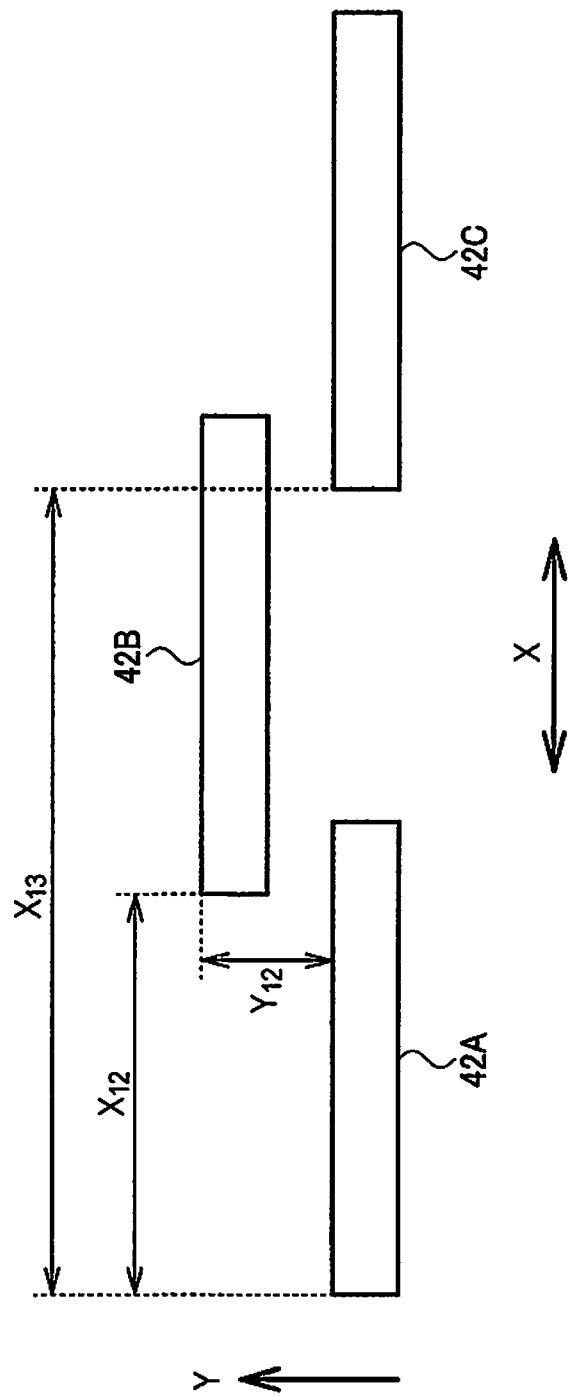
FIG. 3 is a diagram describing a positional relationship of a plurality of image sensors.

FIG. 3 is a diagram describing the arrangement of a plurality of image sensors 42. As illustrated in FIG. 3, the plurality of image sensors 42 are arranged in the main scan direction. The number of image sensors 42 is not limited to three and may be greater than or equal to four. As illustrated in FIG. 3, by lining up the plurality of image sensors 42 in the main scan direction, a width in which the original document D can be read is increased.

Two adjacent image sensors 42A and 42B are at different positions in the subscan direction and are disposed at positions at which their end parts overlap in the main scan direction. In the example in FIG. 3, the image sensor 42B is arranged at a position away by $Y_{12}$ from the image sensor 42A in the Y direction. In addition, the length from the left side end of the image sensor 42A to the left side end of the image sensor 42B in the X direction is denoted by $X_{12}$, and $X_{12}$ is smaller than the horizontal width of the image sensor 42. Similarly, two adjacent image sensors 42B and 42C are at different positions in the subscan direction and are disposed at positions at which their end parts overlap in the main scan direction.

An example in which the image sensor 42A and the image sensor 42C are at the same position in the subscan direction is illustrated. The image sensor 42 of the embodiment includes a first image sensor group of which the position in the subscan direction is a first position, and a second image sensor group of which the position in the subscan direction is a second position. The image sensor 42 included in the first image sensor group is alternately arranged with the image sensor 42 included in the second image sensor group in the main scan direction. In the example in FIG. 3, the first image sensor group corresponds to the image sensor 42A and the image sensor 42C, and the second image sensor group corresponds to the image sensor 42B. The arrangement of the image sensor 42 is not limited to such an example, provided that conditions such that two adjacent image sensors 42 are at different positions in the subscan direction, and their end parts overlap in the main scan direction are satisfied. For example, the image sensor 42A and the image sensor 42C may be at different positions in the subscan direction. By way of caution, the group may include one or a plurality of image sensors and is not limited to a set of a plurality of image sensors.

Figure 4:
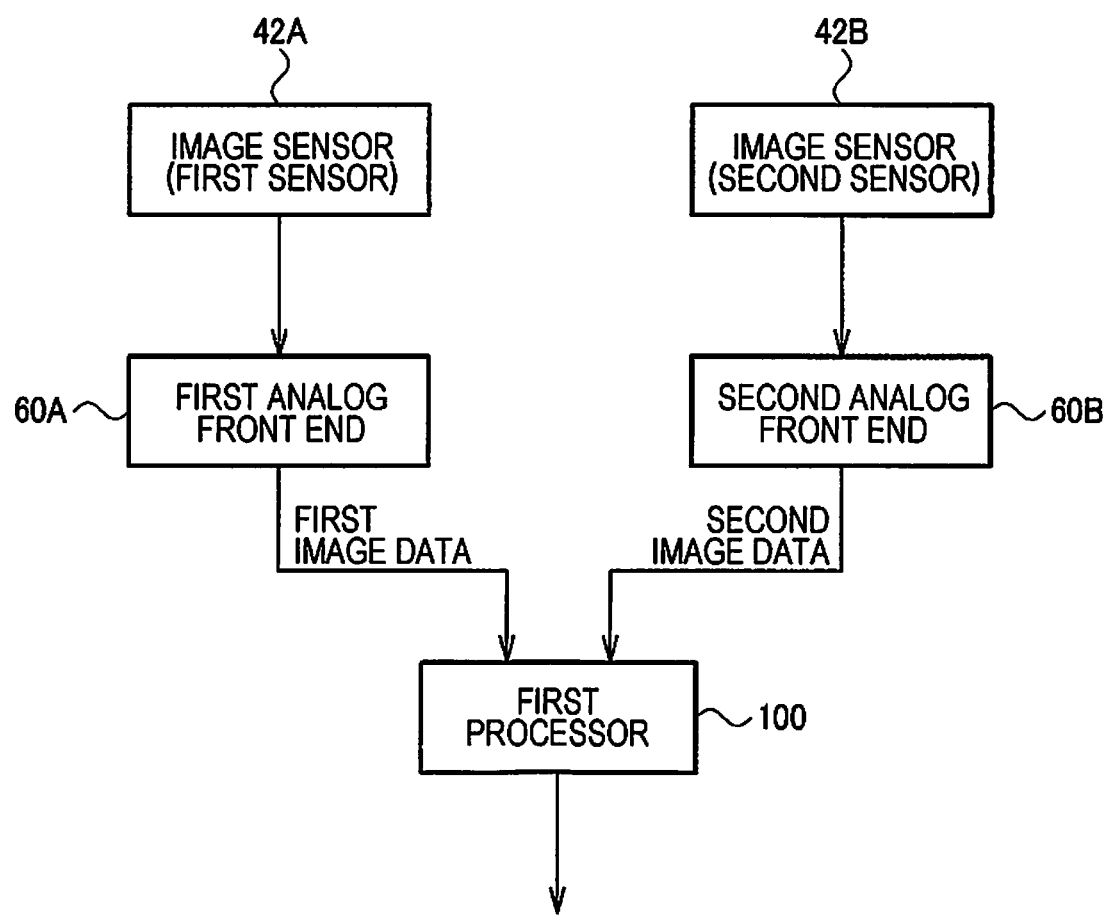
FIG. 4 is a system configuration example of the image reading apparatus.

FIG. 4 is a configuration example of a part of the image reading apparatus 11 related to a merge process for image data from two image sensors 42. The image reading apparatus 11 includes a first sensor that reads a first area of an image of the reading target, and a second sensor that reads a second area that partially overlaps with the first area in the image of the reading target. In the following description, the first sensor corresponds to the image sensor 42A, and the second sensor corresponds to the image sensor 42B. In this case, the first area is an area that is determined by the horizontal width of the image sensor 42A and the positional relationship between the image sensor 42A and the original document D, and is specifically a rectangular area that is long in the subscan direction. The second area is an area that is determined by the horizontal width of the image sensor 42B and the positional relationship between the image sensor 42B and the original document D, and is specifically a rectangular area that is long in the subscan direction.

In addition, the image reading apparatus 11 includes a first processor 100 that generates a merge image by performing a merge process on first image data generated by reading by the first sensor and second image data generated by reading by the second sensor. The first image data is a reading result of the first sensor and is image data corresponding to the first area of the original document D. The second image data is a reading result of the second sensor and is image data corresponding to the second area of the original document D.

Each process and each function of the embodiment performed by the first processor 100 can be implemented by a processor including hardware. For example, each process of the embodiment can be implemented by a processor that operates based on information such as a program, and a memory that stores information such as a program.

In the processor, for example, the function of each unit may be implemented by individual hardware, or the function of each unit may be implemented by single hardware. In addition, one function may be implemented by cooperation between a plurality of hardware units. For example, the processor can include hardware, and the hardware can include at least one of a circuit processing a digital signal and a circuit processing an analog signal. For example, the processor can be configured with one or a plurality of circuit devices or one or a plurality of circuit elements mounted on a circuit substrate. The circuit device is an integrated circuit (IC) or the like, and the circuit element is a resistor, a capacitor, or the like. The processor may be, for example, a central processing unit (CPU). The processor is not limited to a CPU, and various processors such as a graphics processing unit (GPU) or a digital signal processor (DSP) can be used. In addition, the processor may be a hardware circuit based on an application specific integrated circuit (ASIC). In addition, the processor may be configured with a plurality of CPUs or may be configured with a hardware circuit based on a plurality of ASICs. In addition, the processor may be configured with a combination of a plurality of CPUs and a hardware circuit based on a plurality of ASICs. In a narrow sense, the first processor 100 is a system-on-a-chip (SoC) in which a processor core, a memory, and an interface for data transfer are mounted on one chip. The same applies to a second processor 110 and a third processor 120 described below.

In addition, as illustrated in FIG. 4, the image reading apparatus 11 includes a first analog front end 60A and a second analog front end 60B. The first processor 100 performs a process of generating the merge image by digital signal processing based on the first image data from the first analog front end 60A and the second image data from the second analog front end 60B.

Figure 5:
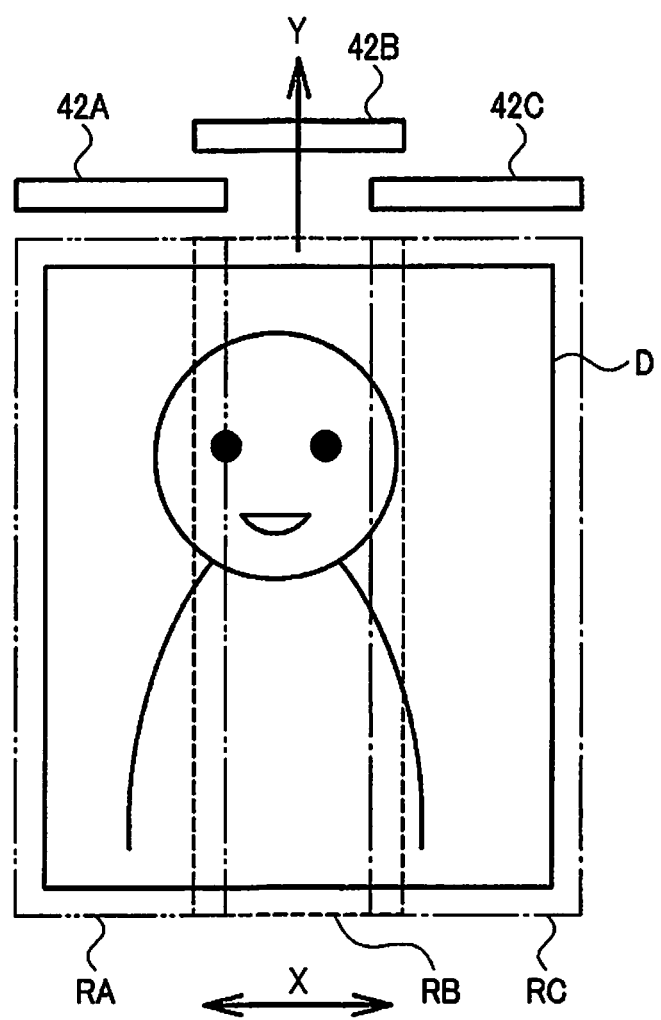
FIG. 5 is a diagram describing a relationship between an image sensor and an original document.

FIG. 5 is a diagram describing a relationship between the original document D and the image sensor 42. The original document D is transported in the Y direction which is the transport direction. The image sensor 42A reads an image of an area denoted by RA. The image sensor 42B reads an image of an area denoted by RB. The image sensor 42C reads an image of an area denoted by RC. An overscan area can be disposed in the subscan direction by starting reading before the leading edge of the original document D reaches the image sensor 42 and continuing reading after the trailing edge of the original document D passes through the image sensor 42. In addition, as illustrated in FIG. 5, an overscan area can also be disposed in the main scan direction by setting the width in which the image sensor 42 is disposed to be greater than the assumed width of the original document D. By disposing the overscan area, inclination correction or the like in a case where the original document D has an oblique motion with respect to the transport direction can be performed. The overscan area is an area in which data of the original document D is not present in an ideal transport state where an oblique motion does not occur.

In RA in FIG. 5, at least a range in which the original document D is read corresponds to the first area of the embodiment. Similarly, in RB, at least a range in which the original document D is read corresponds to the second area. In RC, at least a range in which the original document D is read corresponds to a third area. The whole RA may be set as the first area. The whole area RB may be set as the second area. The whole RC may be set as the third area.

Figure 6:
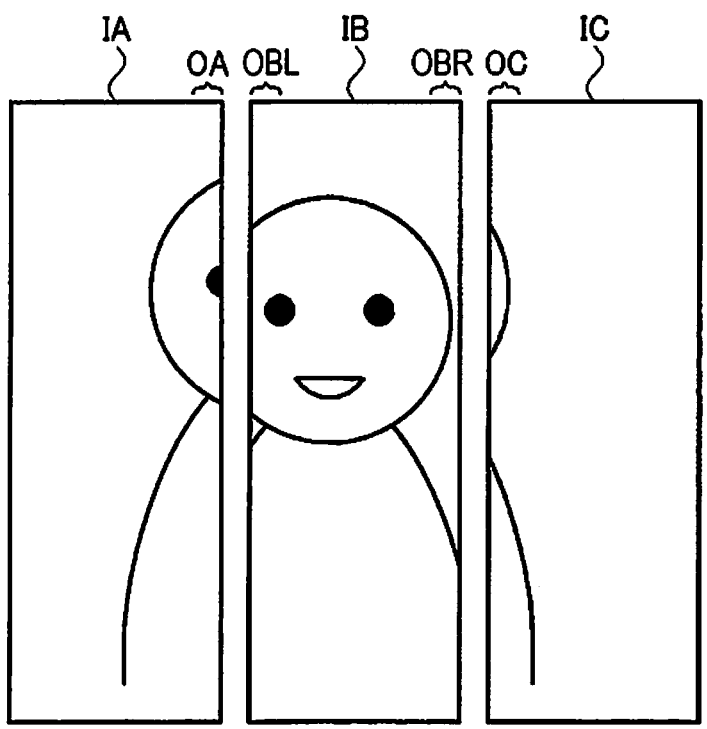
FIG. 6 is an example of image data that is a reading result.

FIG. 6 is a diagram representing the reading results of the image sensors 42A to 42C. In FIG. 6, the first image data corresponding to the reading result of the image sensor 42A is denoted by IA. The second image data corresponding to the reading result of the image sensor 42B is denoted by IB. Third image data corresponding to the reading result of the image sensor 42C is denoted by IC.

As illustrated in FIG. 5, the image sensor 42B and the image sensor 42A are at different positions in the subscan direction. Thus, in a case where images read at the same timing are compared, the image sensor 42B is later by the number of pixels corresponding to $Y_{12}$ than the image sensor 42A. Thus, as illustrated in FIG. 6, in a case where images are lined up such that the reading timing is aligned, the second image data (IB) deviates in the downward direction, compared to the first image data (IA) and the third image data (IC).

Figure 7:
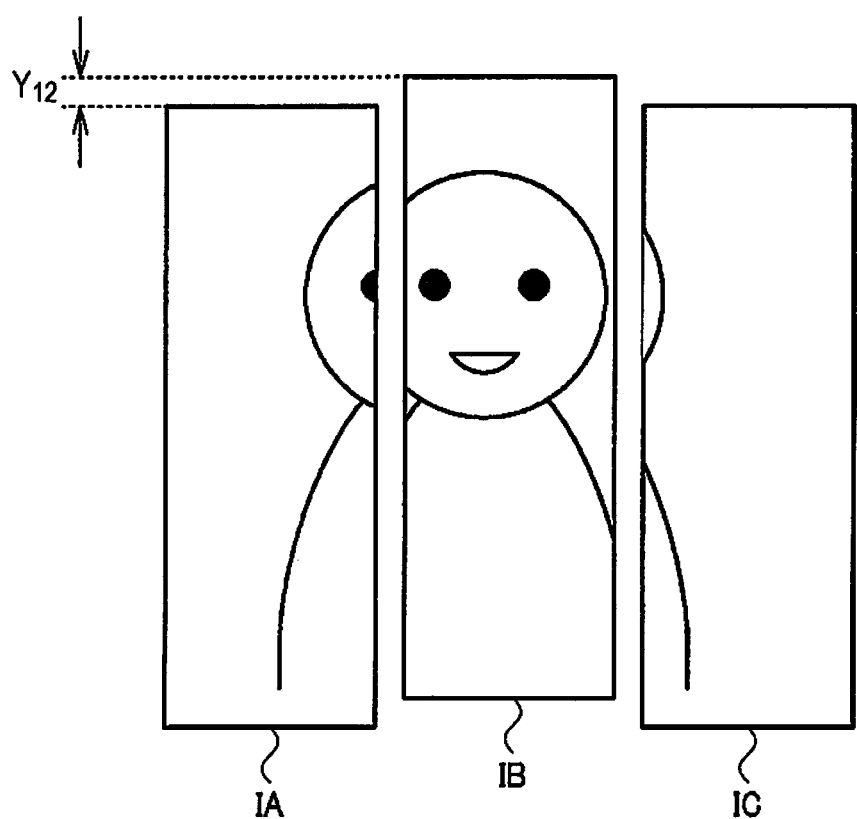
FIG. 7 is a diagram describing a position correction process in a subscan direction.

FIG. 7 is a descriptive diagram of a process of correcting the position in the subscan direction. Here, $Y_{12}$ that denotes the difference in attaching position between the image sensor 42A and the image sensor 42B is data that is known in a design stage of the image reading apparatus 11. Thus, the first processor 100 corrects the position in the subscan direction by performing a process of relatively moving the second image data in an upward direction by the number of pixels corresponding to $Y_{12}$.

In addition, as illustrated in FIG. 5, the end parts of the adjacent image sensors 42 overlap in the main scan direction. Thus, the first area and the second area overlap partially. Hereinafter, this area will be referred to as an overlap area.

Thus, the first image data (OA) corresponding to the overlap area and the second image data ($OB_L$) corresponding to the overlap area are data acquired by reading a common image. Similarly, the second image data ($OB_R$) corresponding to an overlap area between the second area and the third area and the third image data (OC) corresponding to the overlap area are data acquired by reading a common image. In the case of distinguishing the overlap area between the first area and the second area from the overlap area between the second area and the third area, the former will be referred to as a first overlap area, and the latter will be referred to as a second overlap area. The position in the subscan direction may be corrected by analyzing the image and calculating $Y_{12}$. This analysis is, for example, calculation of the number of pixels needed for matching a pattern of the image in the first overlap area of the first area and a pattern of the image in the first overlap area of the second area.

Figure 8:
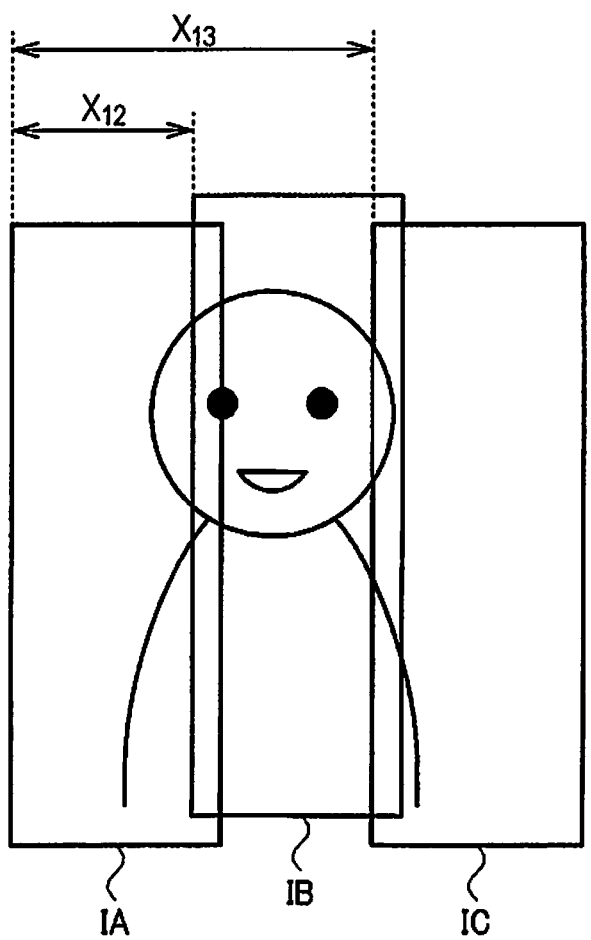
FIG. 8 is a diagram describing the position correction process in a main scan direction.

FIG. 8 is a descriptive diagram of a process of correcting the position in the main scan direction. Here, $X_{12}$ that denotes the difference in attaching position between the image sensor 42A and the image sensor 42B is data that is known in the design stage of the image reading apparatus 11. Thus, the image reading apparatus 11 corrects the position in the main scan direction such that the left side end of the second image data is positioned at a position away by the number of pixels corresponding to $X_{12}$ from the left side end of the first image data. Similarly, the image reading apparatus 11 corrects the position of the third image data in the main scan direction such that the left side end of the third image data is positioned at a position away by the number of pixels corresponding to $X_{13}$ from the left side end of the first image data.

By performing the position correction illustrated in FIG. 7 and FIG. 8, a plurality of image data acquired by the plurality of image sensors 42 can be merged in an appropriate positional relationship.

The image reading apparatus 11 of the embodiment includes three or more image sensors 42 as illustrated in FIG. 3 and FIG. 5. In the case of merging the first image data to the third image data using one processor, a processor that has an interface for receiving three image data and can execute the merge process for three image data needs to be used. The interface is an interface that receives image data from the image sensor 42, and is, for example, low voltage differential signaling (LVDS). Other serial interfaces or parallel interfaces may be used as the interface. In addition, the interface is not limited to an interface that directly receives image data from the image sensor 42, and may be an interface that receives image data through an analog front end as illustrated in FIG. 4. While a processor that can receive and process two image data for the front side and the rear side by considering a double side scan is widely used, a processor for three or more image data as a target is a dedicated product, and development cost is high.

Figure 9:
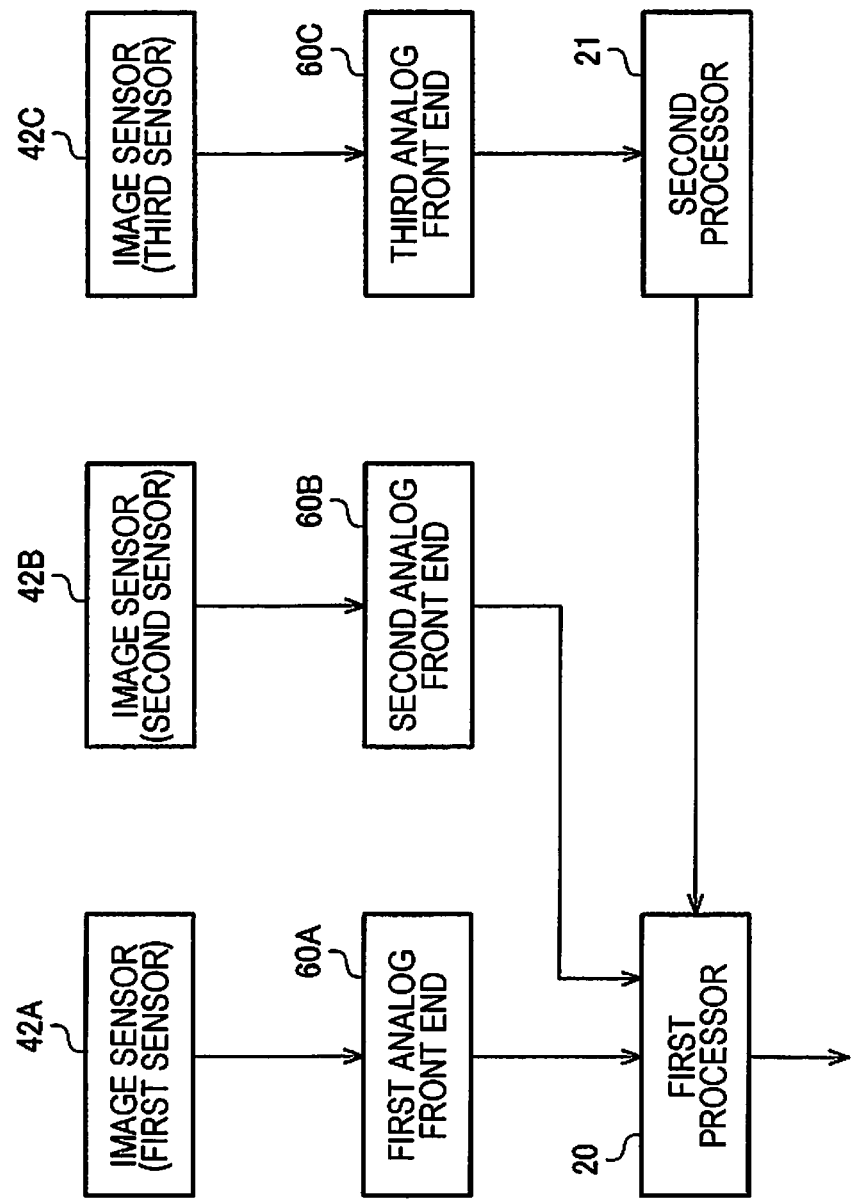
FIG. 9 is a configuration example of an image reading apparatus of a comparative example.

FIG. 9 is a comparative example of a configuration of processing three image data using two processors that can receive and process two image data. A first processor 20 of the comparative example receives the first image data and the second image data using two input interfaces and generates a first merge image by performing the merge process. In addition, a second processor 21 of the comparative example receives the third image data through a third analog front end 60C. The first processor 20 receives the third image data from the second processor 21 using inter-processor communication wiring and generates an output image by performing the merge process on the first merge image and the third image data. The inter-processor communication wiring is, for example, Universal Serial Bus (USB) and is different from the interface for receiving image data. By doing so, three image data can be processed using two processors that can receive and process image data. Thus, such a configuration can reduce cost and is more desirable than a configuration of the related art in which a dedicated processor including three input interfaces is prepared.

However, in the configuration in FIG. 9, the first processor 20 generates the first merge image by performing the merge process on two image data, and the second processor 21 only receives the third image data. Even in the case of performing image processing, the image processing is limited to pre-processing such as shading correction. Furthermore, after the generation of the first merge image, the merge process for the third image data further needs to be executed. That is, two merge processes are executed in order while processing is concentrated in the first processor 20. The reason is that, for example, the first processor 20 executes a process such as correction of individual differences twice and, depending on cases, further executes a cutting process or an inclination correction process. Thus, processing in the first processor 20 causes a bottleneck, and it is difficult to increase the speed of a reading process. Specifically, in a case where processing performance in the first processor 20 is lower than the total output data rate of the image sensor 42A and the image sensor 42B, the performance of the image sensor 42 cannot be fully exhibited, and the reading speed is decreased.

Figure 10:
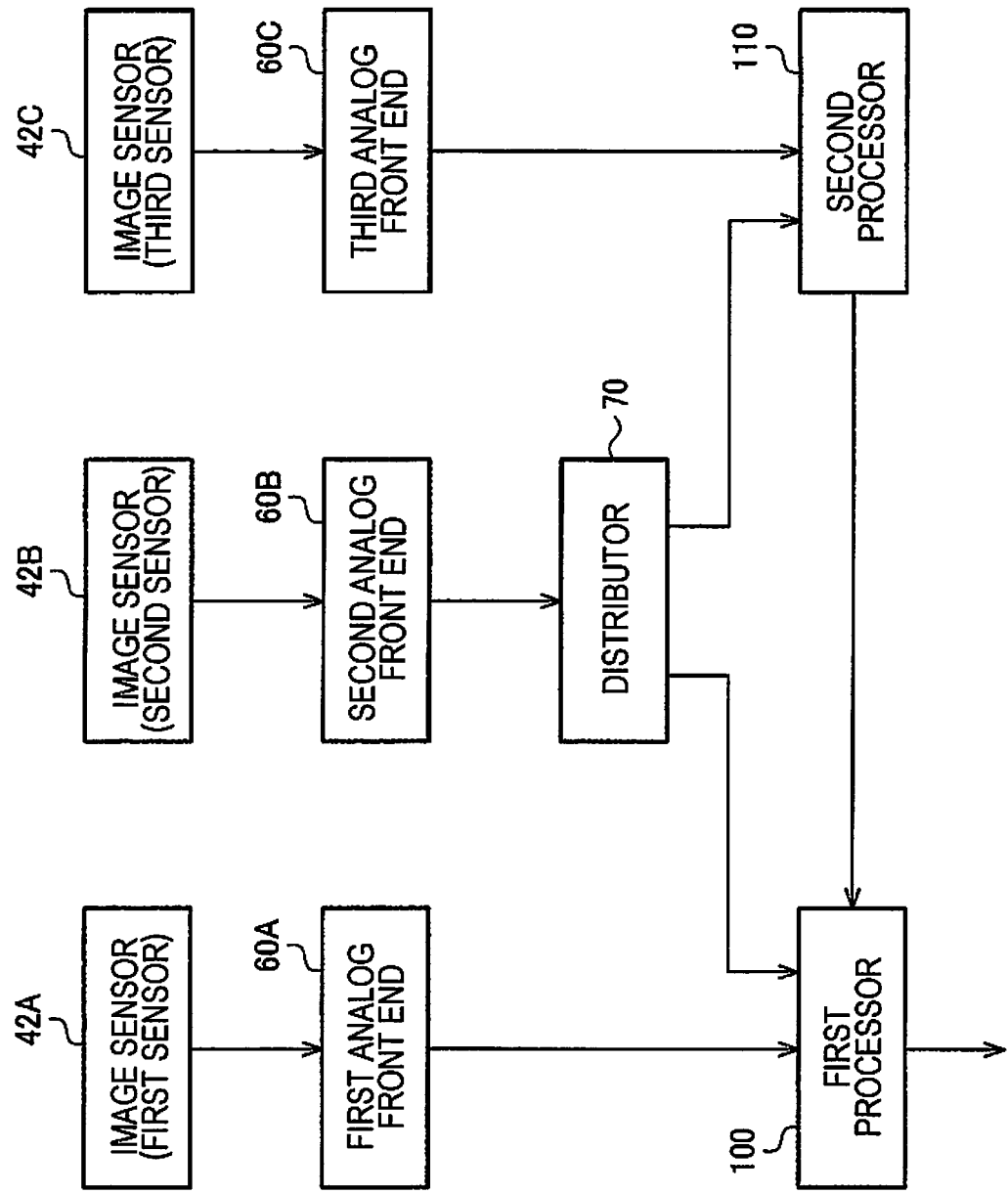
FIG. 10 is a configuration example of the image reading apparatus of the embodiment.

FIG. 10 is a configuration example of the image reading apparatus 11 of the embodiment. The image reading apparatus 11 includes the first sensor that reads the first area, the second sensor that reads the second area, and a third sensor that reads the third area. Hereinafter, the first sensor will be referred to as the image sensor 42A. The second sensor will be referred to as the image sensor 42B. The third sensor will be referred to as the image sensor 42C. The third area is an area that is determined by the horizontal width of the image sensor 42C and the positional relationship between the image sensor 42C and the original document D, and is specifically a rectangular area that is long in the subscan direction. The third area is specifically an area that partially overlaps with the second area and does not overlap with the first area. The third image data is a reading result of the third sensor and is image data corresponding to the third area of the original document D.

Furthermore, the image reading apparatus 11 includes the first processor 100 and the second processor 110. The first processor 100 performs a first merge process of generating the first merge image including the first area and the second area based on the first image data acquired by reading by the first sensor and the second image data acquired by reading by the second sensor. The second processor 110 performs a second merge process of generating a second merge image including the second area and the third area based on the second image data and the third image data acquired by reading by the third sensor. The image reading apparatus 11 generates the output image by performing a linking process on the first merge image and the second merge image. The linking process is a process having a smaller amount of processing amount than the merge process.

The first merge process of generating the first merge image needs to correct individual differences and the like between the first sensor and the second sensor. For example, processes in FIG. 13 to FIG. 18 described below are needed. In addition, as preprocessing for the linking process, the first merge process may need the oblique motion correction process including the cutting process and the inclination correction process described below using FIG. 25. Similarly, the second merge process of generating the second merge image needs to correct individual differences and the like between the second sensor and the third sensor and, depending on cases, needs the oblique motion correction process. Meanwhile, the linking process for the first merge image and the second merge image does not need the processes such as correction of the individual differences, the cutting process, and the inclination correction process performed in the merge process. For example, the output image can be generated by the linking process of simply linking the pixel at the right end of the first merge image with the pixel at the left end of the second merge image.

In the configuration of the embodiment illustrated in FIG. 10, the merge process for the first merge image having a relatively high processing load can be processed in parallel with the merge process for the second merge image by the first processor 100 and the second processor 110. That is, according to the configuration of the embodiment, the image reading apparatus 11 that can perform the reading process at a higher speed than the comparative example can be implemented without using a dedicated processor incurring a high development cost. Furthermore, in the case of performing the oblique motion correction process as will be described below in a second embodiment, the process causes a high load and may be a cause of preventing an increase in speed. Regarding such a point, the image reading apparatus 11 of the embodiment can parallelly execute the oblique motion correction process using two processors. Thus, an increase in speed at the time of executing oblique motion correction is enabled.

As illustrated in FIG. 10, the image reading apparatus 11 includes the first analog front end 60A, the second analog front end 60B, and the third analog front end 60C.

The first analog front end 60A performs A/D conversion on an analog signal from the first sensor and outputs the first image data of digital data to the first processor 100.

The third analog front end 60C performs A/D conversion on an analog signal from the third sensor and outputs the third image data of digital data to the second processor 110.

The second analog front end 60B performs A/D conversion on an analog signal from the second sensor and outputs the second image data of digital data to the first processor 100 and the second processor 110. In such a manner, by distributing the second image data to two processors, an increase in the speed of reading is enabled. While a distributor 70 that distributes the output of the second analog front end 60B is illustrated in FIG. 10, the second analog front end 60B may be configured to be directly connected to the first processor 100 and the second processor 110. The distributor 70 is a distribution circuit in a narrow sense.

By doing so, a process related to image merge can be implemented by a digital process. A process corresponding to a situation can be easily implemented by digitally performing the correction process. In addition, each processor needs various processes such as an offset process and the oblique motion correction process. Thus, by digitally performing a process, circuit size can be reduced, compared to that in the case of using an analog circuit.

The first image data to the third image data that are targets for the merge process in the embodiment may be, but not limited to, the outputs of the first analog front end 60A to the third analog front end 60C. For example, the first processor 100 may perform well-known preprocessing such as shading correction on the first image data from the first analog front end 60A and the second image data from the second analog front end 60B and may perform the merge process on the first image data and the second image data after preprocessing as targets. That is, the "first image data acquired by reading by the first sensor" in the embodiment is data acquired by performing preprocessing including at least the A/D conversion process on the analog signal of the output of the first sensor, and the preprocessing can include various processes such as an analog gain process and a digital shading correction process. The same applies to the second image data and the third image data.

In the example in FIG. 10, the first processor 100 acquires the second merge image from the second processor 110 and generates the output image by performing the linking process based on the first merge image and the second merge image. That is, the process of generating the output image is performed by the first processor 100. By doing so, a processor that performs the merge process on two image data can also be used for generating the output image. Communication between the first processor 100 and the second processor 110 can be implemented by communication wiring such as USB as described above.

The configuration of the image reading apparatus 11 is not limited to FIG. 10. For example, as illustrated in FIG. 11, the image reading apparatus 11 may include the third processor 120 that acquires the first merge image from the first processor 100, acquires the second merge image from the second processor 110, and generates the output image by performing the linking process based on the first merge image and the second merge image.

In the configuration in FIG. 10, the output image generated by the first processor 100 is output to an apparatus such as a PC through communication wiring (output interface) such as USB. However, depending on the performance of the first processor 100, transfer performance using the output interface may not be sufficient. The transfer performance of the first processor 100 may be lower than the total output data rate of the image sensor 42A and the image sensor 42B. Thus, the performance of the image sensor cannot be fully exhibited, and the reading speed may be decreased.

Figure 11:
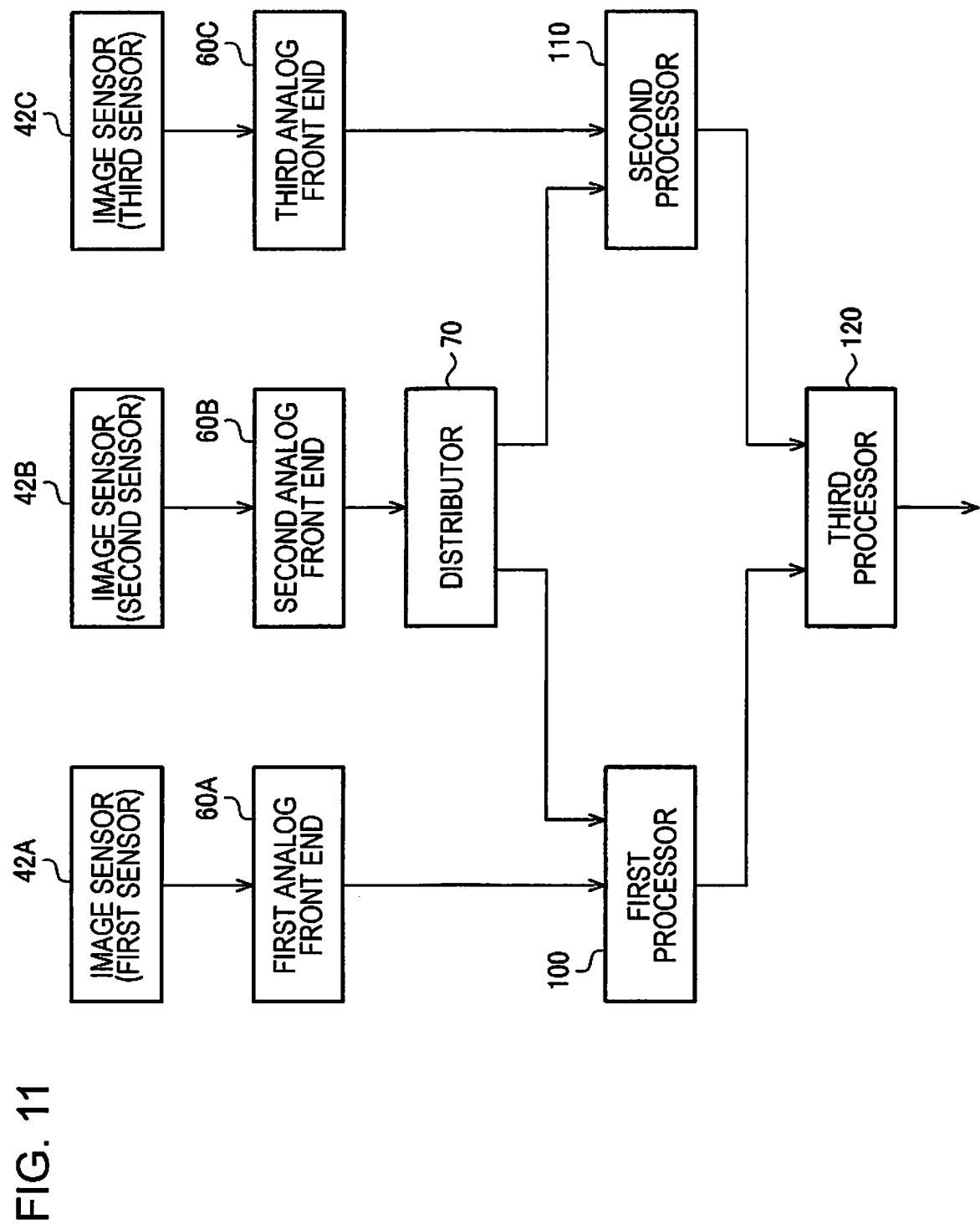
FIG. 11 is another configuration example of the image reading apparatus of the embodiment.

Regarding such a point, in the configuration in FIG. 11, the first merge image is the target to be output to the third processor 120 by the first processor 100. Thus, the amount of data is smaller than the output image. Thus, a situation in which the transfer performance of the first processor 100 causes a bottleneck can be reduced. An increase in the speed of the reading process is enabled by using a processor having higher transfer performance than the first processor 100 as the third processor 120.

2. First Embodiment

First, a first embodiment will be described. In the first embodiment, a simple embodiment of not performing the cutting process and the inclination correction process for an original document area RD will be described.

2.1 Flow of Process

Figure 12:
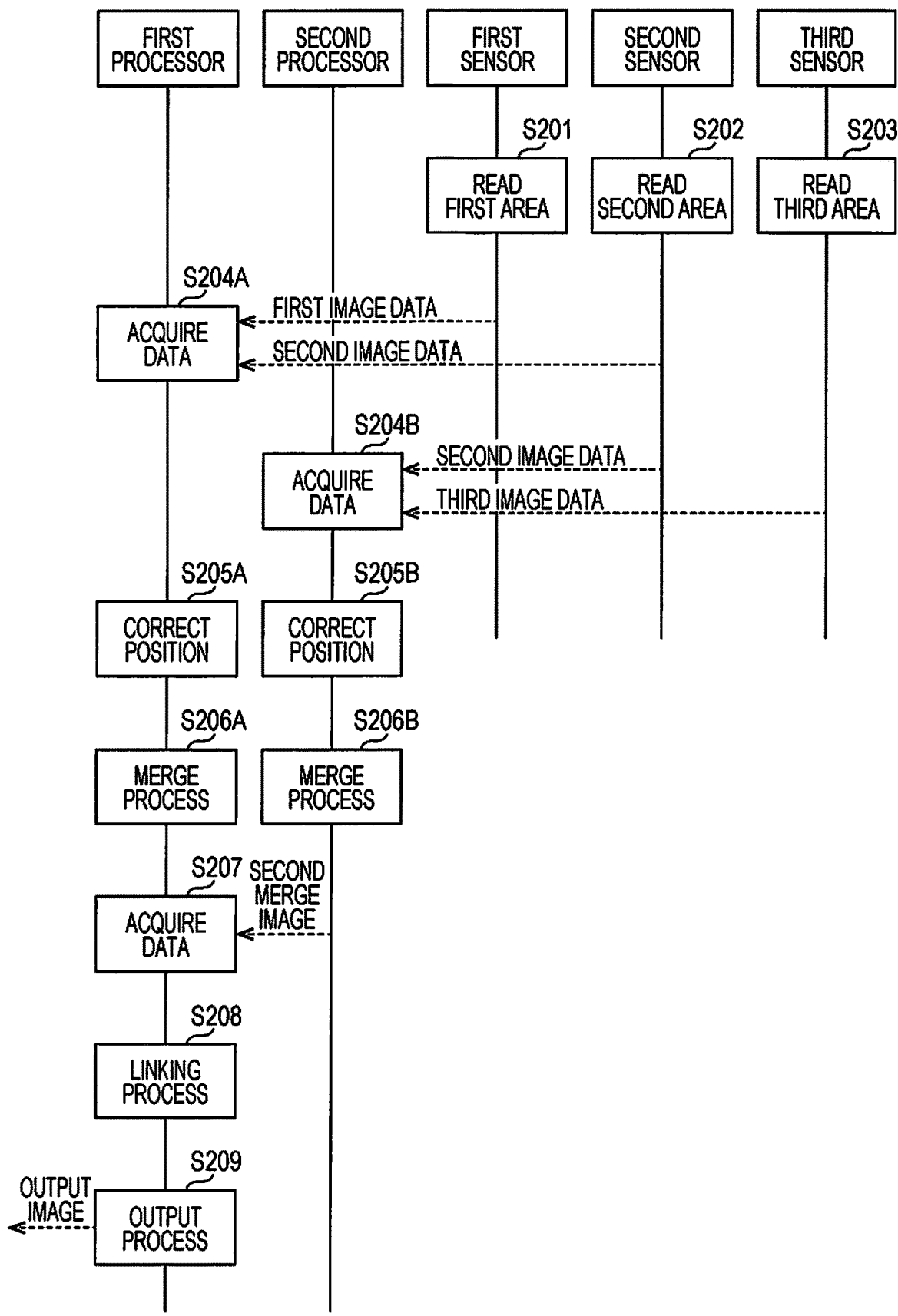
FIG. 12 is a diagram describing a flow of reading process of a first embodiment.

FIG. 12 is a diagram describing the flow of process of the first embodiment. In the reading process, the original document D is transported along the transport path 32 by the transport mechanism 31. The first area is read by the image sensor 42A (S201). The second area is read by the image sensor 42B (S202). The third area is read by the image sensor 42C (S203).

The first processor 100 performs a process of acquiring the first image data acquired by reading by the first sensor and the second image data acquired by reading by the second sensor (S204A). The second processor 110 performs a process of acquiring the second image data acquired by reading by the second sensor and the third image data acquired by reading by the third sensor (S204B). In FIG. 12, the first analog front end 60A, the second analog front end 60B, and the third analog front end 60C are not illustrated for simplification of drawing.

The first processor 100 corrects a positional deviation between the acquired first image data and the second image data (S205A). In addition, the second processor 110 corrects a positional deviation between the acquired second image data and the third image data (S205B). The processes of S205A and S205B are position correction in the subscan direction described in FIG. 7 and position correction in the main scan direction described in FIG. 8.

Next, the first processor 100 performs the merge process on the first image data and the second image data after position correction (S206A). In addition, the second processor 110 performs the merge process on the second image data and the third image data after position correction (S206B). In S206A and S206B, the correction process in which individual differences between the image sensors and an attitude at the time of reading are considered is needed.

Thus, the first processor 100 generates the first merge image by performing the first merge process of merging the first image data with the second image data based on a reading result of the first sensor acquired by reading the first overlap area in which the first area and the second area overlap, and a reading result of the second sensor acquired by reading the first overlap area. The second processor 110 generates the second merge image by performing the second merge process of merging the second image data with the third image data based on a reading result of the second sensor acquired by reading the second overlap area in which the second area and the third area overlap, and a reading result of the third sensor acquired by reading the second overlap area. In the first overlap area, the first sensor and the second sensor read the same image. Thus, by using the reading result of the first overlap area, an appropriate correction process in which individual differences and a difference in the attitude of the original document are considered can be performed. Similarly, by using the reading result of the second overlap area, an appropriate correction process in which individual differences between the second sensor and the third sensor and a difference in the attitude of the original document are considered can be performed.

Next, the second processor 110 outputs the second merge image as a result of the merge process to the first processor 100, and the first processor 100 performs a process of acquiring the second merge image (S207). The first processor 100 generates the output image by performing a process of linking the first merge image generated in S206A with the second merge image acquired in S207 (S208).

The first processor 100 outputs the generated output image to a PC or the like (S209). As illustrated in FIG. 11, the processes of S207, S208, and S209 may be performed by the third processor 120 that is different from any of the first processor 100 and the second processor 110. The output image may be output as a file to the PC through a wired or wireless network, may be output to a FAX apparatus as a FAX signal, may be output as a file to a memory card that is set in a memory card slot of the image reading apparatus, or may be printed as a printed matter using a printing mechanism in the image reading apparatus.

Processes after position correction may be executed on the whole image data as a target after each processor acquires image data of the whole original document D. However, reading of each image sensor 42 is performed per line. The line represents a rectangular area that is long in the main scan direction and is acquired by extracting a range of the original document D corresponding to given one pixel in the subscan direction. In addition, hereinafter, the term line will also be used for data corresponding to given one pixel in the subscan direction in the image data of the reading result. For example, a "given line of image data" represents data acquired by extracting given one pixel in the subscan direction from the image data.

Data acquisition of each processor (S204A and S204B) and position correction (S205A and S205B) can also be executed in order per line of the image data. As will be described using FIG. 13 and the like, the merge process (S206A and S207A) for two image data can also be processed in units of lines. Thus, after reading of data corresponding to one line by the image sensor 42 is completed, the process (S204A to S206A) of the first processor 100 and the process (S204B to S206B) of the second processor 110 may be executed in order in units of lines.

In addition, acquisition of the second merge image (S207) and the linking process (S208) can be processed in order in units of lines. More specifically, in a case where a process of forming the output image with one image or a process of converting the output image into a format such as PDF or JPEG is executed by driver software of the PC or the like, the output process (S209) of the first processor 100 can also be performed in order in units of lines.

2.2 Specific Example of Merge Process

The merge process will be described in detail. While the merge process of the first processor 100 for the first image data and the second image data will be described below, the same applies to the merge process of the second processor 110 for the second image data and the third image data. In addition, the merge process is not limited to the following process, and various modifications can be made.

2.2.1 Summary

The first processor 100 according to the present embodiment calculates a correction value of which the value changes depending on the distance from the overlap area, based on the reading result of the first sensor acquired by reading the overlap area between the first area and the second area and the reading result of the second sensor acquired by reading the overlap area. The first processor 100 generates the merge image by performing the offset process on at least one of the first image data and the second image data using the correction value.

In a method of the present embodiment, first, the correction process is executed by the offset process. The offset process is an addition process or a subtraction process for the correction value. In other words, the processing circuit of the present embodiment generates the merge image without performing gain correction on the first image data and the second image data. Accordingly, excessive correction or the like accompanied by the above gain process can be reduced. The correction value may be any of a positive value or a negative value. That is, in a case where the correction value is a positive value, the offset process is a process of increasing the pixel value. In a case where the correction value is a negative value, the offset process is a process of decreasing the pixel value. In addition, in the following description, the amount of change in pixel value caused by the offset process will be referred to as a "change width", an "increase width", or a "decrease width". Those widths are the absolute value of the correction value and are positive values. Since the gain process is not performed, excessive correction can be reduced. The pixel value may be the brightness value in monochrome image data or may be an R pixel value, a B pixel value, and a G pixel value or a brightness value, a saturation value, and a hue value in color image data. In the present embodiment, the offset process is executed on each of R image data, B image data, and G image data using the color image data.

In addition, in the present embodiment, the first processor 100 generates the merge image by performing the offset process using the correction value that tends to approach zero in a direction away from the overlap area. The correction value that tends to approach zero in a direction away from the overlap area refers to an expression that approaches zero in a direction away from the overlap area in a case where the relationship between the position and the magnitude of the correction value is approximated to a linear expression. For example, the expression includes not only a monotonic change in a narrow sense such that the correction value approaches zero at all times in a direction away from the overlap area, but also a monotonic change in a broad sense such that the correction value does not change in a certain area but approaches zero at all times in another area. By doing so, the change width of the pixel value is decreased in a direction away from the overlap area.

Thus, even in a case where the difference between two evaluation values obtained from the overlap area is significant, excessive correction in the area other than the overlap area can be reduced. In addition, the correction process that prevents a difference in level at a joint between the first image data and the second image data from standing out can be performed. Particularly, in a case where the overlap area is present on both left and right sides like the image sensor 42B, it is desirable to set the correction value to zero around the center of the image sensor 42B and gradually increase the change width of the pixel value in a direction toward the overlap area in the end part of the image sensor 42B. Accordingly, by using the overlap area and an area near the overlap area, the first image data and the second image data can be smoothly joined easily, and the second image data and the third image data can be smoothly joined easily.

Figure 13:
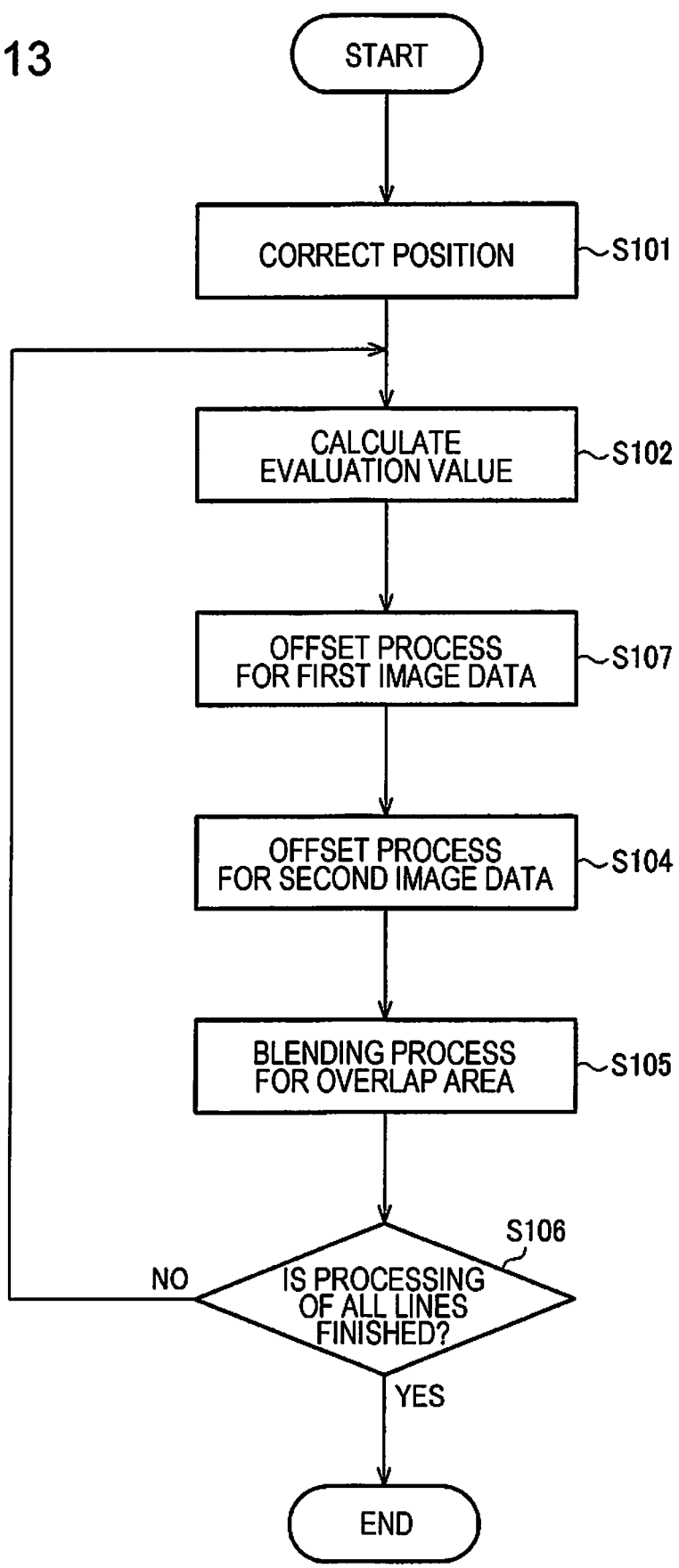
FIG. 13 is a flowchart describing a merge process.

FIG. 13 is a flowchart describing the merge process. In a case where the process is started, first, the first processor 100 performs the position correction process on the first image data and the second image data (S101). The process of S101 corresponds to S205A and S205B in FIG. 12. Next, the first processor 100 calculates the evaluation value to be used for determination of the correction value based on data of the overlap area in the first image data and data of the overlap area in the second image data (S102). Furthermore, the first processor 100 determines the correction value based on the evaluation value and performs the offset process on the first image data (S103). In addition, the first processor 100 determines the correction value based on the evaluation value and performs the offset process on the second image data (S104). The processes of S103 and S104 may be reversed in order or may be executed in parallel.

After the execution of S103 and S104, a blending process for the overlap area between the first image data after the offset process and the second image data after the offset process is performed (S105). By performing the processes of S102 to S105, the merge process for the image data of given one line as a target is completed. The first processor 100 determines whether or not the merge process is performed on all lines of the image data (S106) and finishes the merge process after processing of all lines is finished (Yes in S106). In a case where a line that is not processed yet is present (No in S106), a return is made to S102, and the merge process for the subsequent line as a target is executed. Hereinafter, each process of S102 to S105 will be described in detail.

2.2.2 Calculation Process for Evaluation Value

Figure 14:
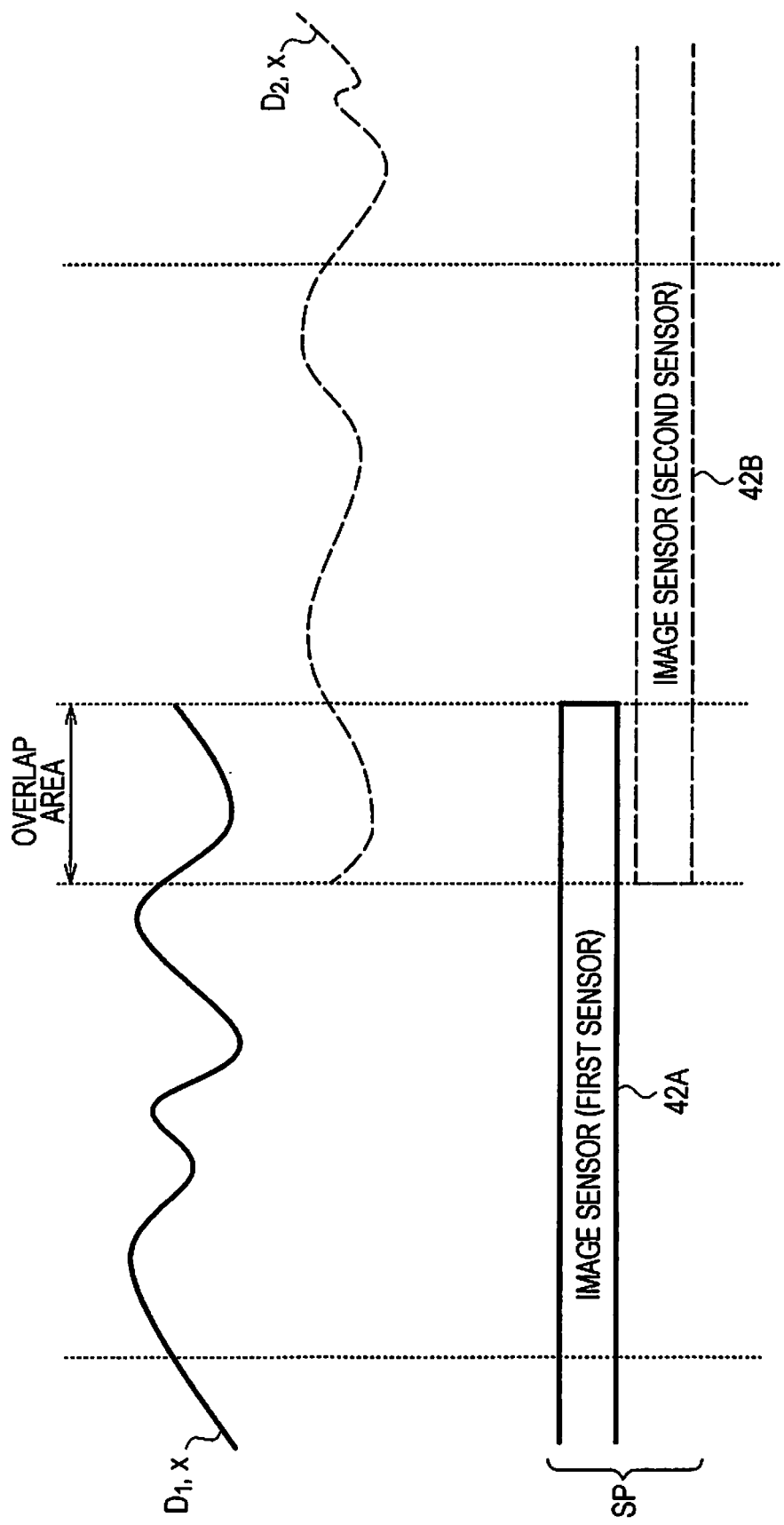
FIG. 14 is an example of a pixel value of the image data.

The calculation process for the evaluation value illustrated in S102 will be described. FIG. 14 is a diagram representing the pixel value of the first image data and the pixel value of the second image data in a given line. In FIG. 14, a horizontal direction represents the main scan direction, and SP denotes the position of the image sensor 42A, which is the first sensor, in the main scan direction and the position of the image sensor 42B, which is the second sensor, in the main scan direction. The positional relationship among the image sensors 42 in the subscan direction is not particularly considered in SP. In addition, $D_1$ denotes a graph representing the pixel value of the first image data, and $D_2$ denotes a graph representing the pixel value of the second image data. The vertical axis of the graph corresponds to the pixel value.

Figure 15:
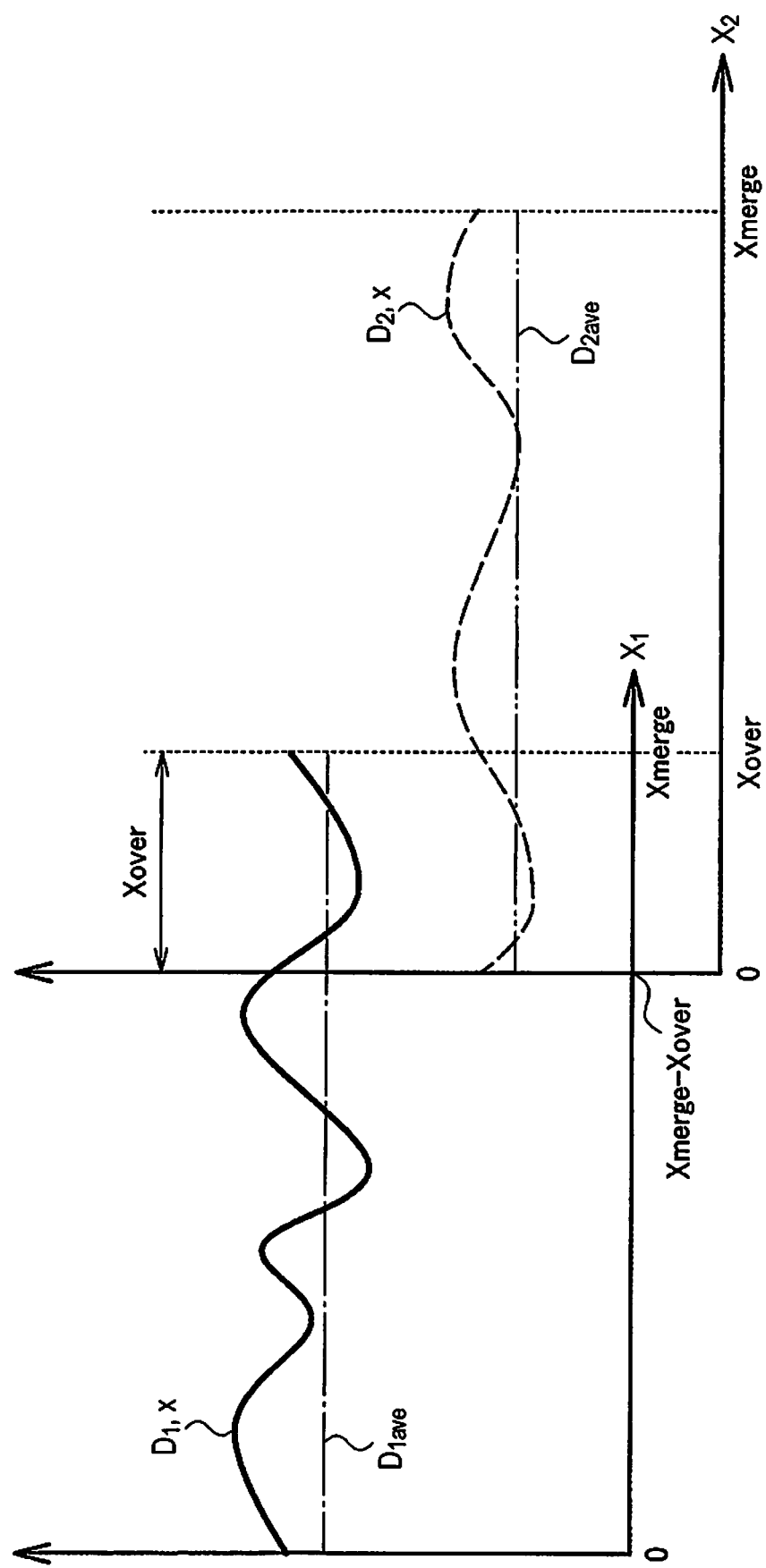
FIG. 15 is a diagram describing coordinate axis setting and an evaluation value calculation process.

FIG. 15 is a diagram describing a setting process for a coordinate system and an evaluation value calculation process in the present embodiment. First, the coordinate system will be described. In the present embodiment, the offset process is performed on a range of a given number of pixels in the first image data as a target. The number of pixels in the target area of the offset process is denoted by Xmerge. Hereinafter, the target area of the offset process will be referred to as a correction target area. Here, Xmerge is a value less than or equal to the number of pixels corresponding to the horizontal width of the image sensor 42A which is the first sensor. More specifically, Xmerge is a value less than or equal to half of the number of pixels corresponding to the horizontal width of the image sensor 42A.

In addition, in the second image data, a partial range is set as a target of the offset process, and the number of pixels in the correction target area is denoted by Xmerge. While an example in which the number of pixels in the correction target area is the same in the first image data and the second image data is described here, a different number of pixels in the correction target area may be set depending on the image data.

In addition, the number of pixels in the overlap area is denoted by Xover. In the present embodiment, it is necessary to prevent the joint from standing out, and a range that includes the overlap area and is larger than the overlap area needs to be set as the correction target area. That is, Xmerge>Xover is established.

An $X_1$ axis is an axis that is set in the main scan direction and is a coordinate axis on which the $X_1$ coordinate value of the end point of the overlap area on the second image data side is equal to Xmerge. The end point of the overlap area on the second image data is the end point of the first image data and is the end point of the first image data on one side of the correction target area.

Thus, the origin of the $X_1$ axis is the end point of the first image data on the other side of the correction target area.

In addition, an $X_2$ axis is an axis that is set in the main scan direction and is a coordinate axis of which the origin is the end point of the overlap area on the first image data side. The end point of the overlap area on the first image data side is the end point of the second image data and is the end point of the second image data on one side of the correction target area. Thus, in the case of setting the origin in such a manner, the $X_2$ coordinate value of the end point of the second image data on the other side of the correction target area is equal to Xmerge.

As illustrated in FIG. 14, while the first image data is present in a range in which the $X_1$ coordinate value satisfies $x_1 < 0$, the first image data in the range is not a target of the offset process in the present embodiment. In addition, the image sensor 42A is almost not present in the range of $x_1$>Xmerge. Thus, in the offset process for the first image data, $x_1$ that is in the range of $0 \le x_1 \le$ Xmerge is considered as the $X_1$ coordinate value. Hereinafter, the pixel value of the first image data at a location at which the $X_1$ coordinate value is equal to $x_1$ will be referred to as $D_1(x_1)$. Similarly, in the offset process for the second image data, $x_2$ in the range of $0 \le x_2 \le$ Xmerge is considered as the $X_2$ coordinate value. The pixel value of the second image data at a location at which the $X_2$ coordinate value is equal to $x_2$ will be referred to as $D_2(x_2)$.

The first processor 100 of the present embodiment calculates the correction value based on the average value of the pixel values acquired by reading the overlap area by the first sensor and the average value of the pixel values acquired by reading the overlap area by the second sensor. In the example in FIG. 15, the pixel value acquired by reading the overlap area by the first sensor is denoted by $D_1(x_1)$ in the case of (Xmerge–Xover)$\le x_1 \le$ Xmerge, and the pixel value acquired by reading the overlap area by the second sensor is denoted by $D_2(x_2)$ in the case of $0 \le x_2 \le$ Xover.

In the overlap area, the same image is a reading target. Thus, $D_1$ and $D_2$ are ideally to match in a case where there are no individual differences among the image sensors 42 or no differences in the attitude of the original document D. In a case where the difference between the characteristics of the pixel value acquired by reading the overlap area by the first sensor and the characteristics of the pixel value acquired by reading the overlap area by the second sensor is known, the joint can be appropriately corrected by a process that reduces the difference. In this case, a process of obtaining the evaluation value and a process of obtaining the correction value based on the evaluation value can be easily performed by using a statistical quantity such as an average value as the evaluation value representing the characteristics. An average value $D_{1ave}$ of the pixel values acquired by reading the overlap area by the first sensor is obtained using Expression (1), and an average value $D_{2ave}$ of the pixel values acquired by reading the overlap area by the second sensor is obtained using Expression (2). While an arithmetic mean is used in Expressions (1) and (2), a modification can be made such that a weighted mean or a trimmed mean is used as the average value. In addition, as described above, $D_1$ and $D_2$ are ideally to match. By appropriately setting an upper limit value for the evaluation value and the correction value, excessive correction can be reduced even in a case where the value of the difference between $D_1$ and $D_2$ is increased due to a sudden cause.

$$D_{1ave} = \sum_{x_1 = Xmerge - Xover}^{Xmerge} \frac{D_1(x_1)}{Xover} \quad (1)$$

$$D_{2ave} = \sum_{x_2 = 0}^{Xover} \frac{D_2(x_2)}{Xover} \quad (2)$$

2.2.3 Offset Process for First Image Data

The offset process for the first image data illustrated in S103 will be described. In a case where a coefficient that is obtained based on the average value $D_{1ave}$ of the pixel values acquired by reading the overlap area by the first sensor, the average value $D_{2ave}$ of the pixel values acquired by reading the overlap area by the second sensor, and Xmerge that is the length of the area on which the offset process is performed in the first image data is denoted by A, the first processor 100 performs the offset process for the first image data using Expression (3). In Expression (3), the pixel value of the first image data after the offset process in a case where the $X_1$ coordinate value is equal to $x_1$ satisfying $0 \le x_1 \le$ Xmerge is denoted by $D'_1(x_1)$.

$$D'_1(x_1) = D_1(x_1) + A \times x_1 \quad (3)$$

As illustrated in FIG. 15, in the case of the above setting, the overlap area is approached as $x_1$ is increased.

That is, in the example of Expression (3), a correction value $A \times x_1$ is set as a linear value such that its absolute value is high on the overlap area side, and its value approaches zero in a direction away from the overlap area, that is, in a direction toward the negative direction side of the $x_1$ axis. In Expression (3), the correction value is equal to zero at $x_1=0$ that is the end point of the correction target area. Thus, the boundary between the correction target area and the area outside the target can be smoothly connected. By using such a correction value, the correction process that reduces excessive correction outside the overlap area and prevents a difference in level at the joint from standing out can be implemented. A specific offset process is performed using, for example, Expression (4).

$$D'_1(x_1) = D_1(x_1) + \frac{D_{2ave} - D_{1ave}}{2 \times Xmerge - Xover} x_1 \quad (4)$$

Figure 16:
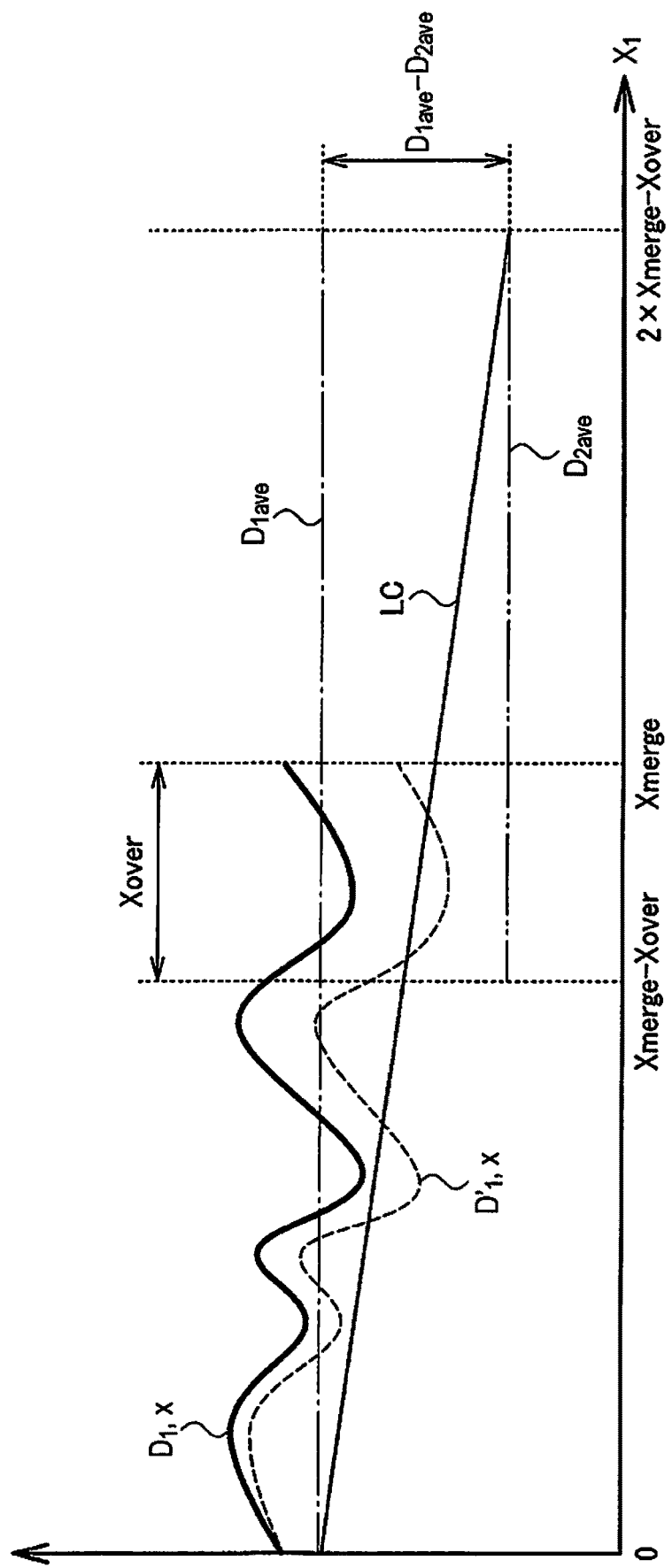
FIG. 16 is a diagram describing an offset process for first image data.

FIG. 16 is a diagram describing the offset process in Expression (4). As described above, the correction value is set such that the correction value is equal to zero at $x_1=0$, and its absolute value is increased as $x_1$ is increased. However, in terms of reducing a difference in level at the joint, it is sufficient that the total of the change width of $D_1$ and the change width of $D_2$ is equal to $|D_{1ave} - D_{2ave}|$, and correction exceeding $|D_{1ave} - D_{2ave}|$ may be excessive correction. Thus, the correction coefficient A in Expression (3) is set such that $|A \times Xmerge| \le |D_{1ave} - D_{2ave}|$ is satisfied.

In FIG. 16, $x_1 = 2 \times$ Xmerge–Xover corresponds to a point at which $x_2 =$ Xmerge is satisfied on the $X_2$ axis, that is, the end point of the correction target area of the second image data. By doing so, the correction value can be set such that its value linearly changes depending on the position in the main scan direction in an area into which the correction target area of the first image data and the correction target area of the second image data are combined.

In this case, the coefficient A is equal to a value acquired by subtracting $D_{1ave}$ from a value of a straight line illustrated by LC. Here, $D_{1ave} > D_{2ave}$ is satisfied. Thus, A<0 is satisfied. The change width of $D_1$ caused by the offset process is equal to zero at the time of $x_1=0$, is increased as $x_1$ is increased, and has a maximum value $|D_{1ave} - D_{2ave}|$ at $x_1 = 2 \times$ Xmerge–Xover. However, since $x_1$ satisfies $0 \le x_1 \le$ Xmerge, the change width of $D_1$ is restricted to a range below $|D_{1ave} - D_{2ave}|$, and an appropriate correction value can be set.

As will be described below using FIG. 17, by setting the correction value for the second image data using the same method, the sum of the amount of change of the first image data and the amount of change of the second image data in the overlap area can be set to $|D_{1ave} - D_{2ave}|$. In other words, in the overlap area, the correction value can be set such that a difference in evaluation value is removed.

2.2.4 Offset Process for Second Image Data

The offset process for the second image data illustrated in S104 will be described. The offset process for the second image data is the same as that for the first image data. In a case where a coefficient that is obtained based on $D_{1ave}$, $D_{2ave}$, and Xmerge is denoted by B, the first processor 100 performs the offset process for the second image data using Expression (5). In Expression (5), the pixel value of the second image data after the offset process is denoted by $D'_2(x_2)$. In addition, the same point as the first image data is that an excessive increase in the absolute value of B is not preferable. Thus, a specific offset process is performed using, for example, Expression (6).

$$D'_2(x_2) = D_2(x_2) + B \times (\text{Xmerge} - x_2) \tag{5}$$

$$D'_2(x_2) = D_2(x_2) - \frac{D_{2ave} - D_{1ave}}{2 \times \text{Xmerge} - \text{Xover}}(\text{Xmerge} - x_2) \tag{6}$$

Figure 17:
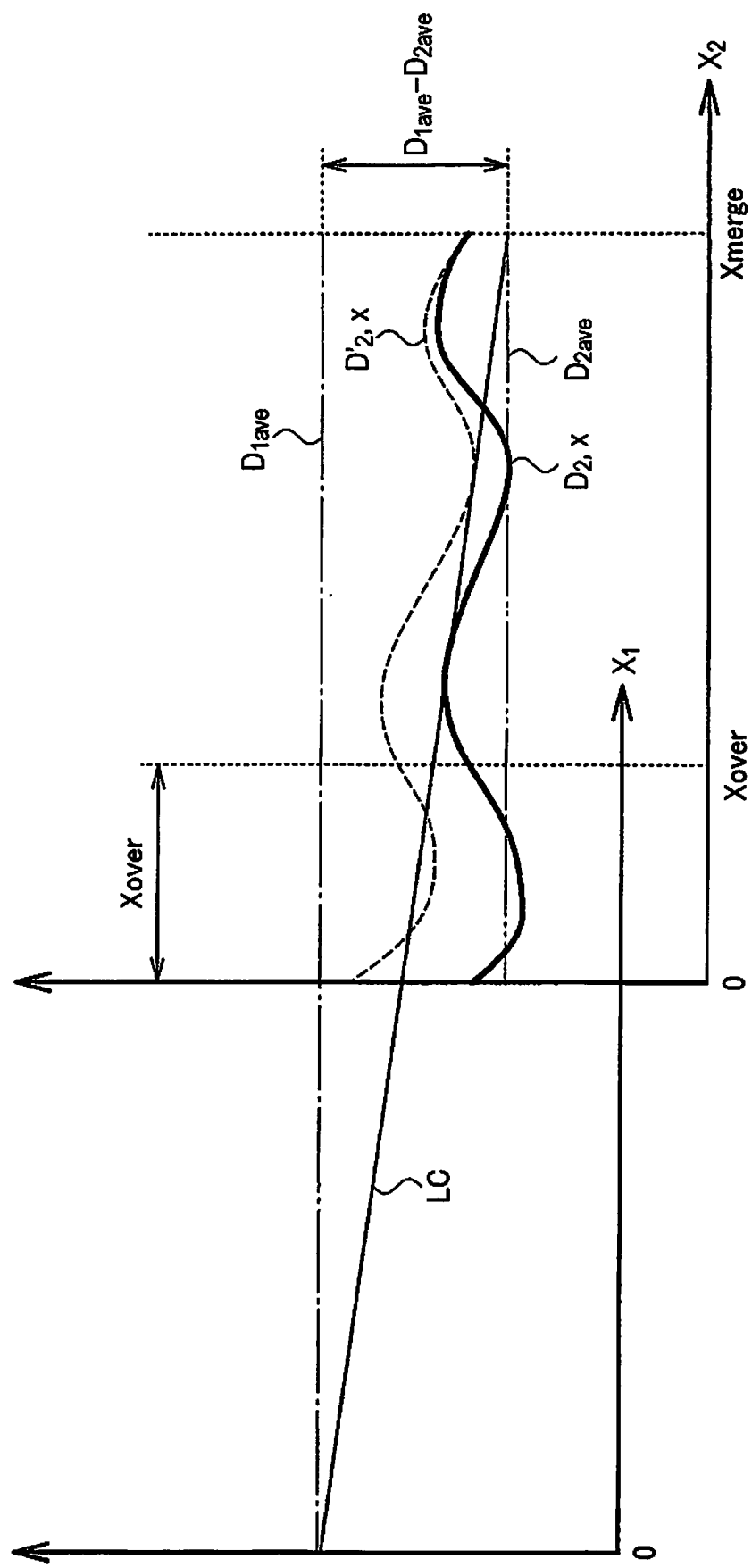
FIG. 17 is a diagram describing the offset process for second image data.

FIG. 17 is a diagram describing the offset process in Expression (6). A straight line illustrated by LC in FIG. 17 is the same as LC in FIG. 16. The origin of the $X_1$ axis, that is, the end point of the correction target area of the first image data, corresponds to $x_2 = -(\text{Xmerge} - \text{Xover})$. By using the correction coefficient corresponding to the inclination of LC in FIG. 17, the correction value can be set such that its value linearly changes depending on the position in the main scan direction in the area into which the correction target area of the first image data and the correction target area of the second image data are combined.

In this case, the coefficient B is equal to a value acquired by reversing the sign of the coefficient in Expression (5) and is equal to a value acquired by subtracting $D_{2ave}$ from the value of the straight line illustrated by LC. Here, $D_{1ave} > D_{2ave}$ is satisfied. Thus, B>0 is satisfied. The change width of $D_2$ caused by the offset process is equal to zero at the time of $x_2 = \text{Xmerge}$, is increased as $x_2$ is decreased, and has a maximum value $|D_{1ave} - D_{2ave}|$ at $X_2 = -(\text{Xmerge} - \text{Xover})$. However, since $x_2$ satisfies $0 \leq x_2 \leq \text{Xmerge}$, the change width of $D_2$ is restricted to a range below $|D_{1ave} - D_{2ave}|$. Accordingly, an appropriate correction value in which both of the change width of the pixel value caused by the offset process for the first image data and the change width of the pixel value caused by the offset process for the second image data are considered can be set.

2.2.5 Blending Process for Overlap Area

The blending process for the overlap area illustrated in S105 will be described. By the process described above, the first image data after the offset process and the second image data after the offset process are obtained.

Figure 18:
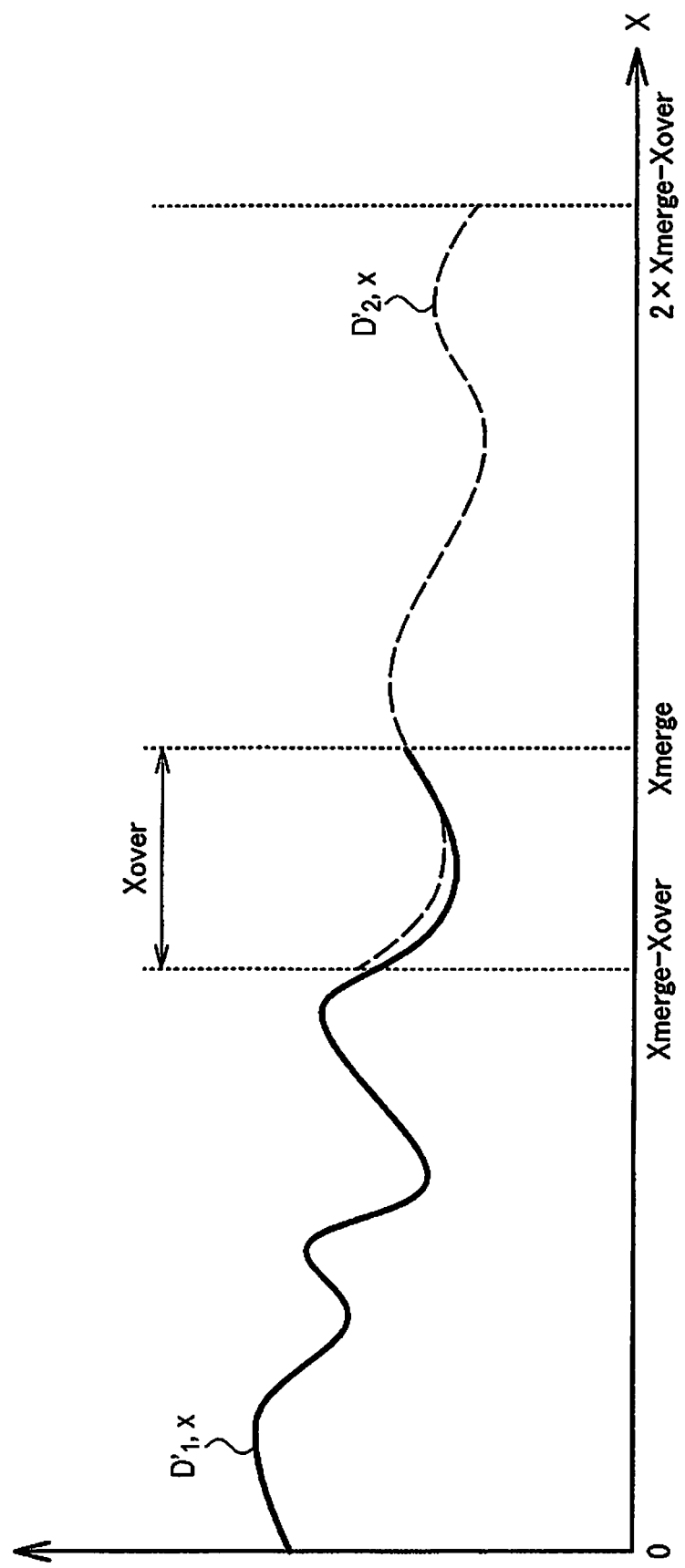
FIG. 18 is a diagram describing a blending process in an overlap area.

FIG. 18 is a diagram representing a pixel value $D'_1$ of the first image data after the offset process and a pixel value $D'_2$ of the second image data after the offset process. A horizontal axis in FIG. 18 is set as an X axis. The X axis is an axis in the main scan direction and has its origin set at the same position as the $X_1$ axis. In a case where the X coordinate value is equal to x, the pixel value of the first image data after the offset process is denoted by $D'_1(x)$, and the pixel value of the second image data after the offset process is denoted by $D'_2(x)$.

As is apparent from FIG. 18, the difference in pixel value between $D'_1(x)$ and $D'_2(x)$ is considered to be smaller than that before the offset process. However, in many cases, the values do not completely match. Since two pixel values are present in the overlap area, a process of determining the pixel value of the final output image is needed.

The first processor 100 generates an image of an area corresponding to the overlap area in the merge image by performing the offset process on the first image data and the second image data using the correction value and merging the first image data after the offset process with the second image data after the offset process. By doing so, the pixel value of the merge image in the overlap area can be appropriately determined.

In the case of x<Xmerge−Xover, only the first image data is present, and the second image data is not present. Thus, in a case where the degree of contribution of $D'_2(x)$ is increased near x=Xmerge−Xover, a leap may occur in the pixel value at the boundary between the overlap area and an area other than the overlap area. Thus, the degree of contribution of $D'_1(x)$ may be increased in an area close to x=Xmerge−Xover. For example, in the case of blending $D'_1(x)$ and $D'_2(x)$ at a ratio of α:(1−α), it is preferable that α=1 be satisfied in the case of x=Xmerge−Xover. Similarly, it is preferable that α=0 be satisfied in the case of x=Xmerge in order to increase the degree of contribution of $D'_2(x)$.

Thus, the first processor 100 determines a pixel value $D'(x)$ of the merge image using Expressions (7) to (9). In the case of x=Xmerge−Xover, Expression (7) matches Expression (8). In the case of x=Xmerge, Expression (7) matches Expression (9). In the case of Xmerge−Xover<x<Xmerge, the coefficient is determined such that as x is increased, the degree of contribution of $D'_1(x)$ is decreased, and the degree of contribution of $D'_2(x)$ is increased.

$$D'(x) = \frac{\text{Xmerge} - x}{\text{Xover}} D'_1(x) + \frac{x - \text{Xmerge} + \text{Xover}}{\text{Xover}} D'_2(x) \tag{7}$$

$$(\text{Xmerge} - \text{Xover} \leq x \leq \text{Xmerge})$$

$$D'(x) = D'_1(x)(0 \leq x \leq \text{Xmerge} - \text{Xover}) \tag{8}$$

$$D'(x) = D'_2(x)(\text{Xmerge} \leq x) \tag{9}$$

While each expression is described above using the $X_1$ axis, the $X_2$ axis, and the X axis as a reference, those skilled in the art may perceive that various modifications can be made to the setting of the coordinate system.

For example, the main scan direction of the image reading apparatus 11 may be set as the X axis. Of two end points of the overlap area, the X coordinate value of the end point on the first sensor side may be denoted by $x_A$, and the X coordinate value of the end point on the second sensor may be denoted by $x_B$. In this case, the overlap area is a range in which the X coordinate value satisfies $x_A \leq x \leq x_B$. In the case of denoting the pixel value of the first image data after the offset process by $D'_1(x)$, denoting the pixel value of the second image data after the offset process by $D'_2(x)$, and denoting the pixel value of the merge image by $D'(x)$, Expression (7) can be modified into Expression (10).

$$D'(x) = \frac{x_B - x}{x_B - x_A} D'_1(x) + \frac{x - x_A}{x_B - x_A} D'_2(x)(x_A \leq x \leq x_B) \tag{10}$$

Figure 19:
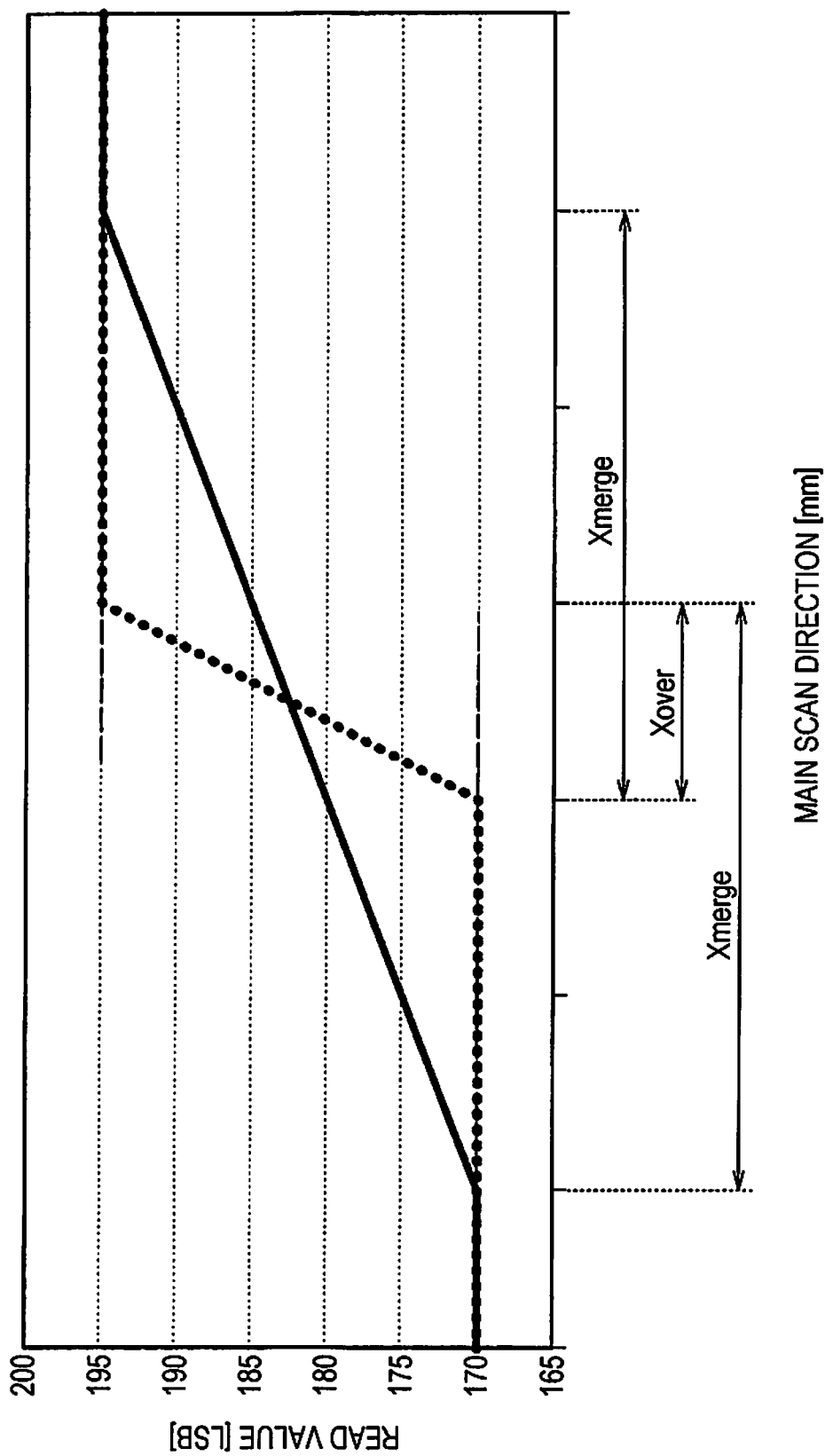
FIG. 19 is a diagram describing a difference in merge result caused by the presence of the offset process.

FIG. 19 is a diagram describing the merge process in a case where the pixel value of each image data is uniform. The result of the blending process in the case of not performing the offset process of the present embodiment is denoted by B1. As is understood from B1, in the case of simply merging the overlap area, the pixel value changes sharply, and the joint stands out. The result of the blending process of the present embodiment is denoted by B2. The first image data and the second image data are corrected by the offset process using the linearly changing correction value, and the blending process is performed after correction. Thus, a change in pixel value at the joint is made less sharp than that in B1. That is, in the present embodiment, the correction process that prevents the joint from standing out can be implemented.

2.3 First Merge Image and Second Merge Image

Next, the length of the correction target area as a target of the offset process and the boundary between the first merge image and the second merge image will be described in detail. The image reading apparatus 11 of the present embodiment includes at least three image sensors 42. The reading area of the image sensor 42 other than those at both ends overlaps with that of a given image sensor 42 on one end side in the main scan direction and overlaps with that of the other image sensor 42 on the other end side in the main scan direction. In the example in FIG. 5, the reading area (RB) of the image sensor 42B overlaps with the reading area (RA) of the image sensor 42A on the left side of FIG. 5 and overlaps with the reading area (RC) of the image sensor 42C on the right side of FIG. 5.

Figure 20:
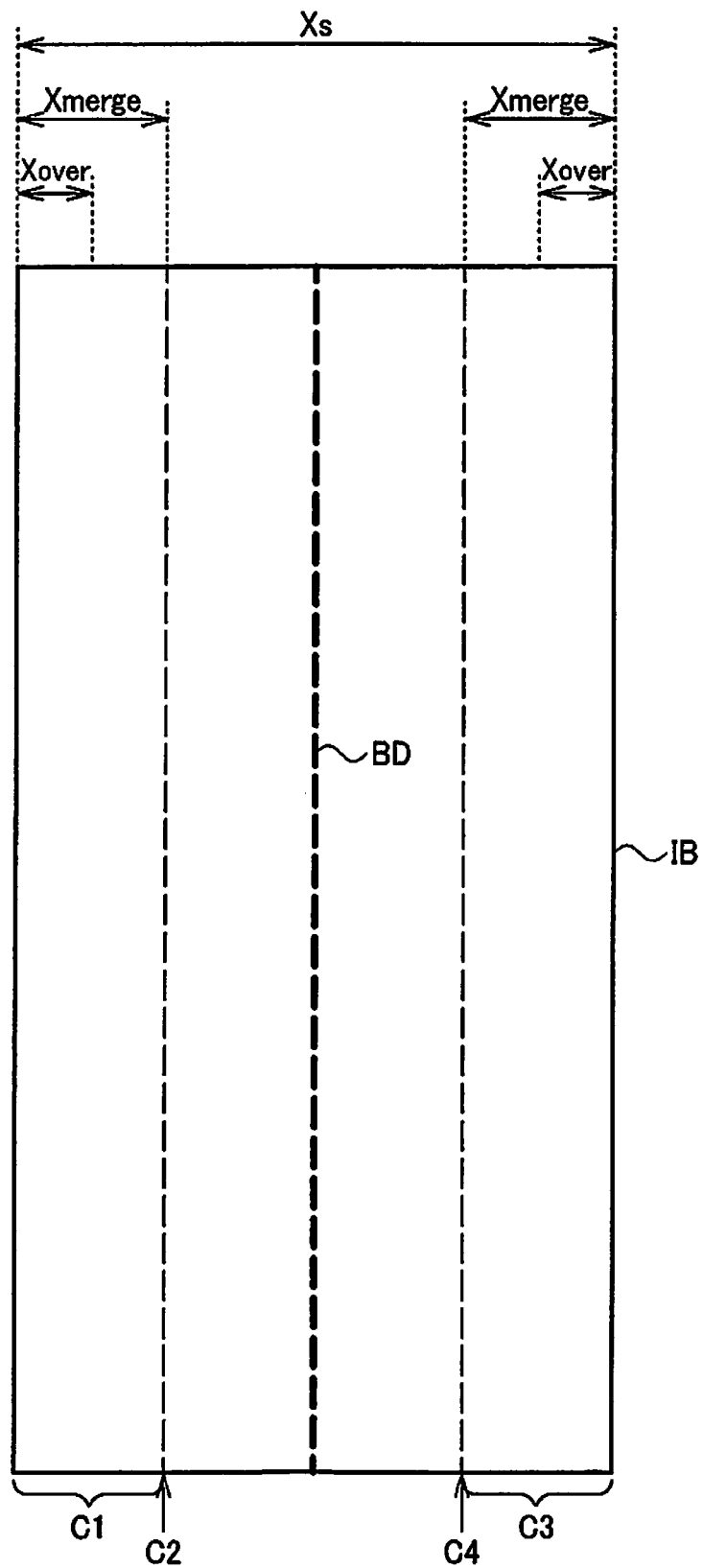
FIG. 20 is a diagram describing an example of setting a target area for the offset process.

FIG. 20 is a diagram describing the offset process for the second image data. As illustrated in FIG. 20, in the second image data, the offset process accompanied by the merge process with the first image data is performed on a range of one end to Xmerge, and the offset process accompanied by the merge process with the third image data is performed on a range of the other end to Xmerge. The number of pixels of the second image data in the main scan direction is denoted by Xs.

In a case where it is considered that the result of the offset process using the first overlap area is reflected on the output image, the first merge image is to be an image into which the first image data is merged with at least a range (C1) from the left end to Xmerge in the second image data. In FIG. 20, C2 denotes the position of Xmerge from the left end. Similarly, in a case where it is considered that the result of the offset process using the second overlap area is reflected on the output image, the second merge image is to be an image into which the third image data is merged with at least a range (C3) from the right end to Xmerge in the second image data. In FIG. 20, C4 denotes the position of Xmerge from the right end.

As in FIG. 20, in the case of Xmerge≤Xs/2, the correction target area of the offset process on the first image data side does not overlap with the correction target area of the offset process on the third image data side. In this case, BD that denotes the boundary between the first merge image and the second merge image is set between C2 and C4. For example, BD is the center of the second image data in the main scan direction. In a case where BD is set as the center of the second image data, the first processor 100 processes half of the second area of the image of the reading target, and the second processor 110 processes the other half. That is, the load of the merge process (S206A and S206B) can be equally divided.

In the case of Xmerge>Xs/2, two correction target areas overlap. In this case, C2 is on the right side of the center of the second image data, and C4 is on the left side of the center. In a case where the boundary BD is set as the center of the second image data, a part of the area on which the offset process based on the first overlap area is performed is excluded from the first merge image. Similarly, a part of the area on which the offset process based on the second overlap area is excluded from the second merge image. In addition, a process for smoothly linking the first merge image with the second merge image may be caused.

It is also considered that without setting one boundary BD, the first merge image is generated using an area on the left side of C2, and the second merge image is generated using an area on the right side of C4. However, in this case, the first merge image overlaps with the second merge image. In a case where two merge images overlap, the first processor 100 needs to calculate a new pixel value based on the pixel values of the two merge images in the overlapping part.

The offset process prevents the joint of two image data from standing out as illustrated by B2 in FIG. 19. That is, it is sufficient that a condition that Xmerge has a width such that a change in pixel is made less sharp is satisfied. More specifically, it is preferable to set the amount of change in the amount of correction per unit length that does not perceptually stand out, and set Xmerge from an assumed degree of error between sensors such that the set amount of change in the amount of correction per unit length is satisfied.

Thus, the first processor 100 desirably generates the first merge image by performing the offset process using the correction value is performed on an area of the first image data shorter than half of the length of the first sensor in the main scan direction, and the offset process using the correction value is performed on an area of the second image data shorter than half of the length of the second sensor in the main scan direction.

3. Second Embodiment

In the present embodiment, a method of correcting an oblique motion of the original document D will be described. The first merge process and the second merge process include the oblique motion correction process in addition to the merge process in a narrow sense described above using FIG. 13.

3.1 Flow of Process

FIG. 21 is a descriptive diagram in a case where an oblique motion of the original document D occurs. In FIG. 21, IA, IB, and IC denote the first image data, the second image data, and the third image data after position correction, respectively. In FIG. 21, RD denotes an area in which it is determined that the original document D is present. Hereinafter, the area in which it is determined that the original document D is present will be referred to as the original document area RD. In FIG. 21, an X axis and a Y axis constitute a coordinate system that is set with respect to the image data. The X axis corresponds to the main scan direction, and the Y axis corresponds to the subscan direction. In the example in FIG. 21, a side that is read first by the image sensor 42 is set in the negative direction of the Y axis.

As illustrated in FIG. 2, the color reference plate 43 is arranged at a position that faces the image sensor 42 with the transport path 32 interposed therebetween. The color reference plate 43 has a color that is different from the color of the base of the original document. The color of the base of the original document D is, for example, white, and the color of the color reference plate 43 is, for example, gray. Thus, the first processor 100 can detect the original document area RD from the image data by determining whether or not each pixel of the image data has the same color as the color reference plate 43.

In inclination correction, an inclination angle θ of the original document D and a width Wd of the original document are detected based on the detection result of the original document area RD. For example, the original document area RD is detected one line at a time from the upper side of the image data, and a point at which the original document area RD is initially found is set as a first reference point P1. The upper side refers to a side that is acquired first in a time series manner. In the example in FIG. 21, the first reference point P1 on the negative direction side of the Y axis is a point corresponding to the end point on one side of the leading edge part of the original document.

After P1 is found, the detection of the original document area RD further continues one line at a time, and a line that initially has the maximum amount of data of one line of the original document is searched. The line is a line that includes a second reference point P2. The second reference point P2 is the end point of the leading edge part of the original document on the different side from the first reference point P1.

In a case where the coordinate values of P1 are denoted by (x1, y1), and the coordinate values of P2 are denoted by (x2, y2), the inclination angle θ is calculated using Expression (11), and the width Wd of the original document D is calculated using Expression (12).

$$\theta = \arctan((y2-y1)/(x2-x1)) \quad (11)$$

$$Wd = |x2-x1|/\cos\theta \quad (12)$$

As illustrated in FIG. 21, the oblique motion of the original document D can be corrected by performing the cutting process of cutting out the original document area RD from the whole image data including the overscan area and the inclination correction process of rotating the original document area RD by θ. Hereinafter, a process in which the cutting process and the inclination correction process are combined will be referred to as the oblique motion correction process. In the oblique motion correction process, a process of determining the pixel value of the image after the process one pixel at a time is performed. As illustrated in FIG. 21, it is understood that the pixel at the upper left corner of the image after the oblique motion correction process corresponds to the first reference point P1 of the original image data. However, due to the oblique motion, one pixel of the original image data does not correctly correspond to one pixel of the image after the process. Thus, in the oblique motion correction, the pixel value at the upper left corner of the output image is determined using the surrounding pixels of the first reference point P1. For example, the average of four surrounding pixels including the first reference point P1 or the average of nine surrounding pixels is used. Alternatively, any weight may be given instead of calculating a simple average. The same applies to other pixels. A corresponding pixel is specified from the original image data, and a calculation process for the pixel value is performed based on the pixel values of a plurality of pixels including the pixel.

It is considered that an image after all of the first image data to the third image data are merged is used as a target of the oblique motion correction process. For example, the first processor 100 performs the oblique motion correction process on the image generated by the linking process of S208 in FIG. 12 and outputs the result of the process as the output image. In this case, it can be considered that the oblique motion correction is the same as a method in the related art in which the oblique motion correction process is performed on the reading result of one image sensor 42.

However, in the oblique motion correction process, as described above, the average value or the like of a plurality of pixel values needs to be calculated for each pixel, and the processing load is high. Even though the load is distributed by dividing the merge process into S206A and S206B, the oblique motion correction process having a high load is concentrated in the first processor 100. Thus, the effect of increasing the speed of the reading process deteriorates.

Thus, in the present embodiment, the first merge process performed by the first processor 100 includes the cutting process and the inclination correction process. The second merge process performed by the second processor 110 includes the cutting process and the inclination correction process. The image reading apparatus 11 generates the output image by performing the linking process on the first merge image generated by the first merge process including the cutting process and the inclination correction process and the second merge image generated by the second merge process including the cutting process and the inclination correction process.

The output image may be generated by the first processor 100 or may be generated by the third processor 120. By doing so, the processing load of the oblique motion correction process can be distributed between the first processor 100 and the second processor 110. Thus, an increase in the speed of the reading process can be implemented. Since the oblique motion correction process is performed as preprocessing for the linking process, the linking process does not need to include the cutting process and the inclination correction process and has a lower load than the merge process.

At this point, the image reading apparatus 11 performs a detection process for the original document area RD, which is an area in which the original document of the reading target is read, based on an image into which the output of the first sensor, the output of the second sensor, and the output of the third sensor are merged. Based on the detected original document area RD, original document width information related to the reading target and inclination angle information are detected. The first processor 100 performs the cutting process and the inclination correction process included in the first merge process based on the original document width information and the inclination angle information. The second processor 110 performs the cutting process and the inclination correction process included in the second merge process based on the original document width information and the inclination angle information.

The original document width information is information representing the width of the original document D, and the inclination angle information is information representing the inclination angle of the original document D with respect to an ideal state. The original document width information is specifically the width Wd of the original document D and can be expanded to other information representing the width of the original document. While Wd is detected based on the image data and thus, is assumed to be information representing the number of pixels, Wd may be converted to be in units of millimeters or the like and be processed. Similarly, the inclination angle information is specifically the inclination angle θ with respect to an ideal attitude and can be expanded to other information representing the inclination angle.

In the case of detecting the original document width information and the inclination angle information, all of the first image data to the third image data do not need to be set as a target. In the example in FIG. 21, the original document width Wd and the inclination angle θ can be calculated in a case where the first reference point P1 and the second reference point P2 can be detected. Thus, based on the image into which the output of the first sensor, the output of the second sensor, and the output of the third sensor corresponding to leading predetermined lines are merged, the original document area RD is detected, and the original document width information and the inclination angle information are detected. The predetermined lines are, for example, 100 lines, and various modifications can be made.

The third image data is not input into the first processor 100. Thus, in the example in FIG. 21, the second reference point P2 cannot be detected. The first image data is not input into the second processor 110. Thus, in the example in FIG. 21, the first reference point P1 cannot be detected. Thus, the original document width Wd cannot be detected by each individual processor, and the boundary BD between the first merge image and the second merge image may not be easily set. Regarding such a point, in the present embodiment, parameters needed for the cutting process and the inclination correction process are acquired by merging three image data in advance. Thus, the process of each processor can be appropriately executed.

Figure 22A:
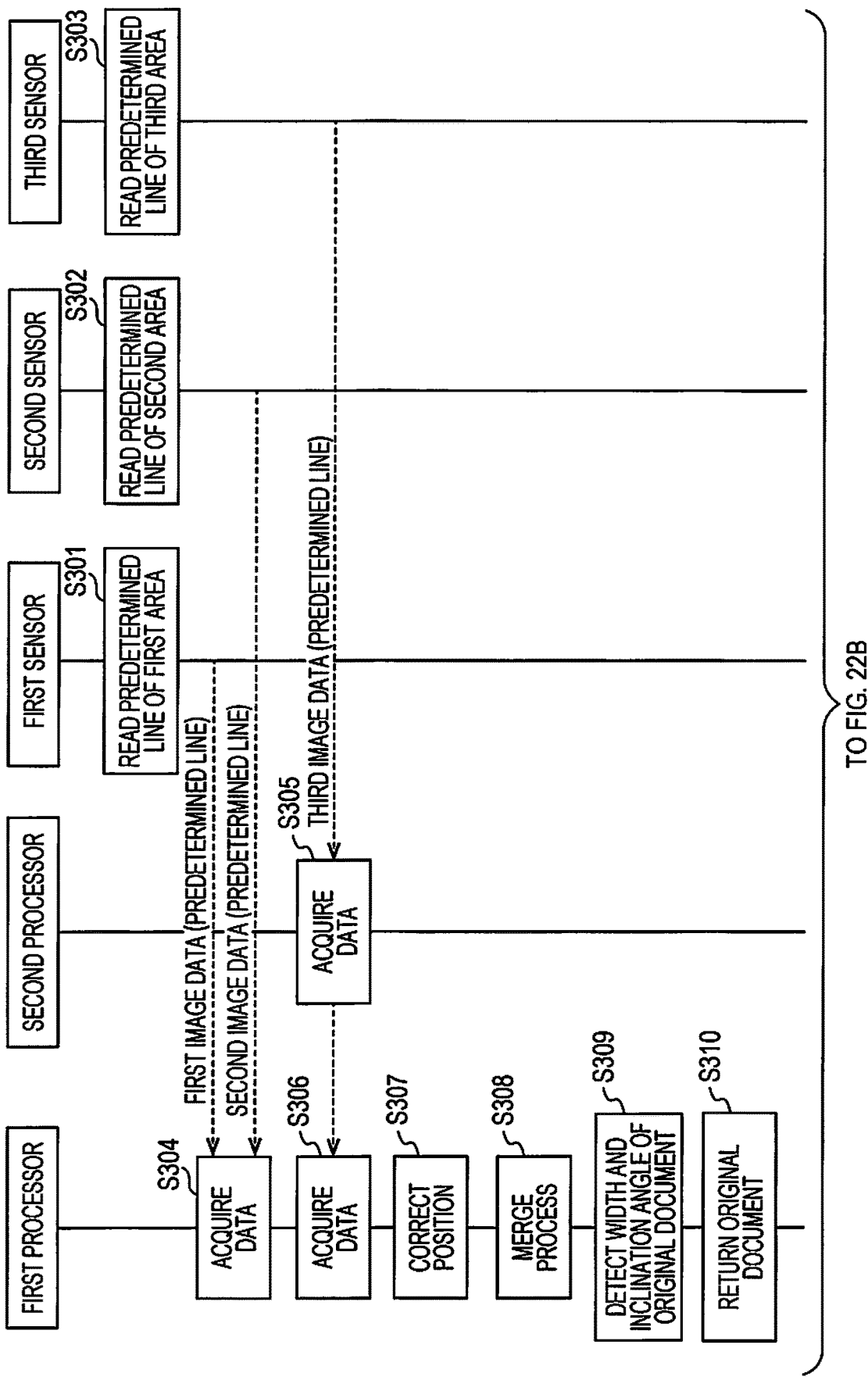

FIGS. 22A and 22B are diagrams describing the flow of process of the second embodiment. In the present embodiment, first, a preparatory reading process for detecting the original document width Wd and the inclination angle θ is executed. Specifically, the predetermined lines of the original document D are transported along the transport path 32 by the transport mechanism 31. The first area is read by the image sensor 42A (S301). The second area is read by the image sensor 42B (S302). The third area is read by the image sensor 42C (S303). Reading in S301 to S303 is reading that targets the predetermined lines of the original document D on the leading side.

The preparatory reading is performed for detecting Wd and θ for the cutting process and the inclination correction process. Since it is sufficient that the original document area RD can be identified from other areas, a difference in brightness or tone between the image sensors 42 is not a concern. Thus, the merge process described below in S308 may be a simple process that does not accompany the correction process, and the load does not need to be distributed between two processors.

Thus, the first processor 100 performs a process of acquiring the first image data by reading by the first sensor and the second image data by reading by the second sensor (S304). The second processor 110 performs a process of acquiring the third image data by reading by the third sensor (S305). Furthermore, the first processor 100 performs a process of acquiring the third image data from the second processor 110 (S306).

The first processor 100 corrects a positional deviation among the acquired first image data, the second image data, and the third image data (S307) and performs the merge process (S308). For example, the process of S308 can be implemented by a simple process of selecting the pixel value of any one of the first image data and the second image data as a pixel value corresponding to the first overlap area. The same applies to the second overlap area. By the process of S308, an image into which the predetermined lines of the first image data to the third image data on the leading side are merged is acquired. The second processor 110 may acquire both of the second image data and the third image data, and the position correction process and the merge process may be executed in parallel by two processors.

Next, the first processor 100 detects the original document width Wd and the inclination angle θ based on the image acquired in S308 (S309). Specifically, the original document area RD is detected, and the first reference point P1 and the second reference point P2 are detected. Expressions (11) and (12) are calculated. The detected original document width Wd and the inclination angle θ are also transmitted to the second processor 110.

Next, a control for returning the original document D to a reading start position is performed (S310), and the reading process is started again. Specifically, reading of the original document D by each image sensor 42 (S311 to S313), data acquisition by the first processor 100 and the second processor 110 (S314A and S314B), position correction (S315A and S315B), and the merge process (S316A and S316B) are performed. The processes illustrated in S316A and S316B represent processes (the merge process in a narrow sense) in the first merge process and the second merge process before the oblique motion correction process. The processes from S311 to S316A and S316B are the same as those in the first embodiment (S201 to S203, S204A to S206A, and S204B to S206B).

Next, the first processor 100 generates the first merge image by performing the cutting process and the inclination correction process on the result of the merge process in S316A (S317A). The second processor 110 generates the second merge image by performing the cutting process and the inclination correction process on the result of the merge process in S316B (S317B). The processes of S317A and S317B are specifically a process of calculating each pixel value of the image after the oblique motion correction process.

Next, the second processor 110 outputs the second merge image after the cutting process and the inclination correction process to the first processor 100, and the first processor 100 performs a process of acquiring the second merge image (S318). The first processor 100 generates the output image by performing a process of linking the first merge image after the process of S317A with the second merge image acquired in S318 (S319). The first processor 100 outputs the generated output image to the PC or the like (S320). Since processes such as the cutting process and the inclination correction process are not performed again, the effect of not performing those processes can cause the linking process to be processed at a higher speed than the merge process in the case of generating the merge image.

3.2 Cutting Process and Inclination Correction Process

Details of the cutting process and the inclination correction process (S317A and S317B) will be described.

As described above, the oblique motion correction process itself is a well-known method. However, as illustrated in S317A and S317B in FIG. 22B, in the case of processing the oblique motion correction process in a distributed manner between two processors, the boundary BD between the first merge image after the oblique motion correction process and the second merge image after the oblique motion correction process needs to be concerned.

Figure 23:
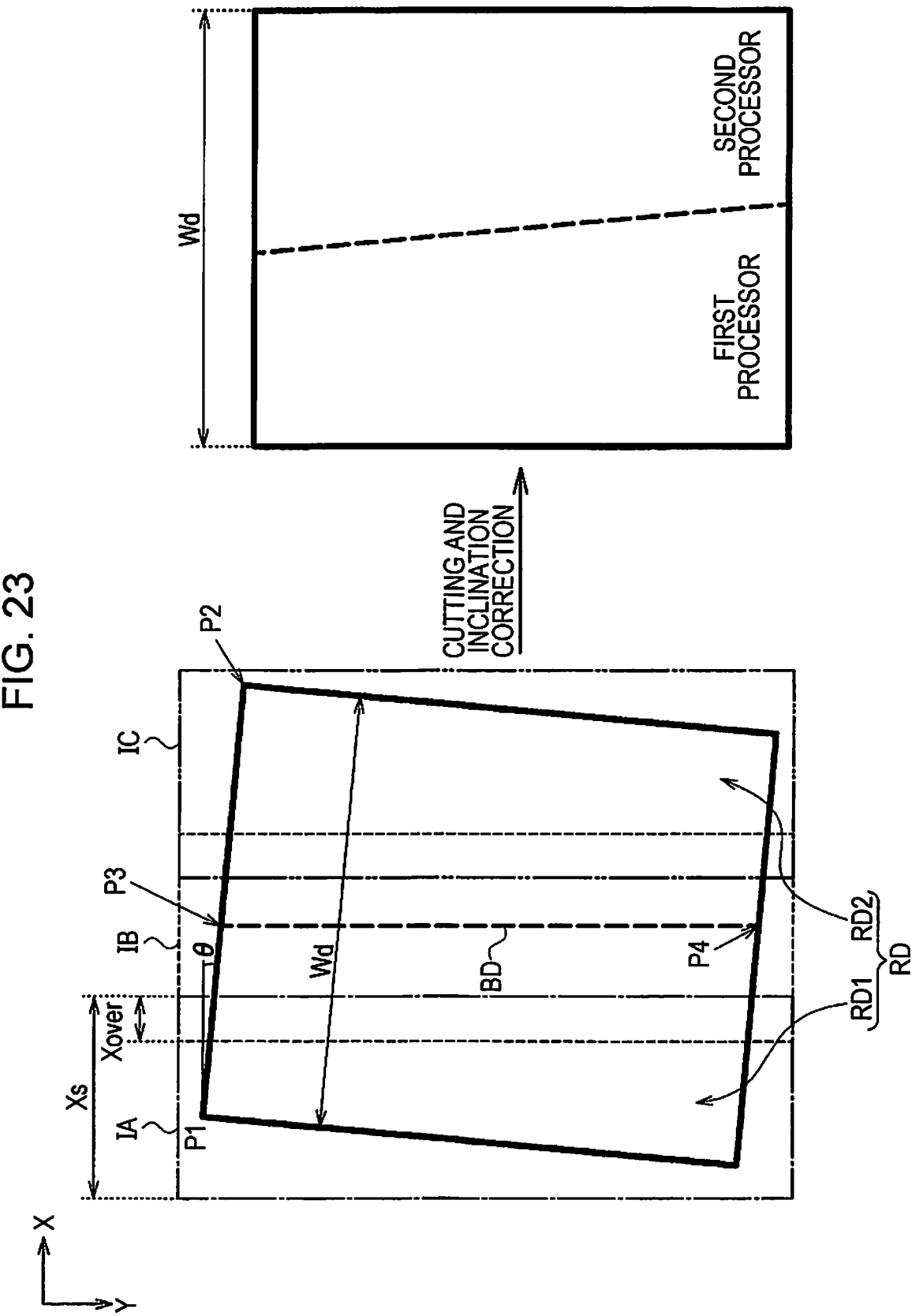
FIG. 23 is an example of setting a boundary in a comparative example.

For example, in the same manner as the first embodiment, it is considered that the boundary BD in a direction corresponding to the subscan direction is set near the center of the second image data in the main scan direction. FIG. 23 is a diagram describing the oblique motion correction process in the case of setting the boundary BD in a direction corresponding to the subscan direction. As illustrated in FIG. 23, the first processor 100 performs the oblique motion correction process on an area having a trapezoidal shape as a target in the original document area RD. Similarly, the second processor 110 performs the oblique motion correction process on an area having a trapezoidal shape as a target in the original document area RD. Hereinafter, in the original document area RD, the target area of the oblique motion correction process performed by the first processor 100 will be referred to as a first original document area RD1, and the target area of the oblique motion correction process performed by the second processor 110 will be referred to as a second original document area RD2.

In a case where the first merge image and the second merge image have an oblong shape as in the first embodiment, a position at which the first merge image is linked with the second merge image is constant regardless of the position in the subscan direction. Thus, in a case where positioning in the main scan direction is performed in a given line, the output image can be generated by linking other lines at the same position. However, in a case where the first merge image and the second merge image after the oblique motion correction process have a trapezoidal shape, the linking position in the main scan direction varies depending on the position in the subscan direction as is apparent from FIG. 23.

Figure 24:
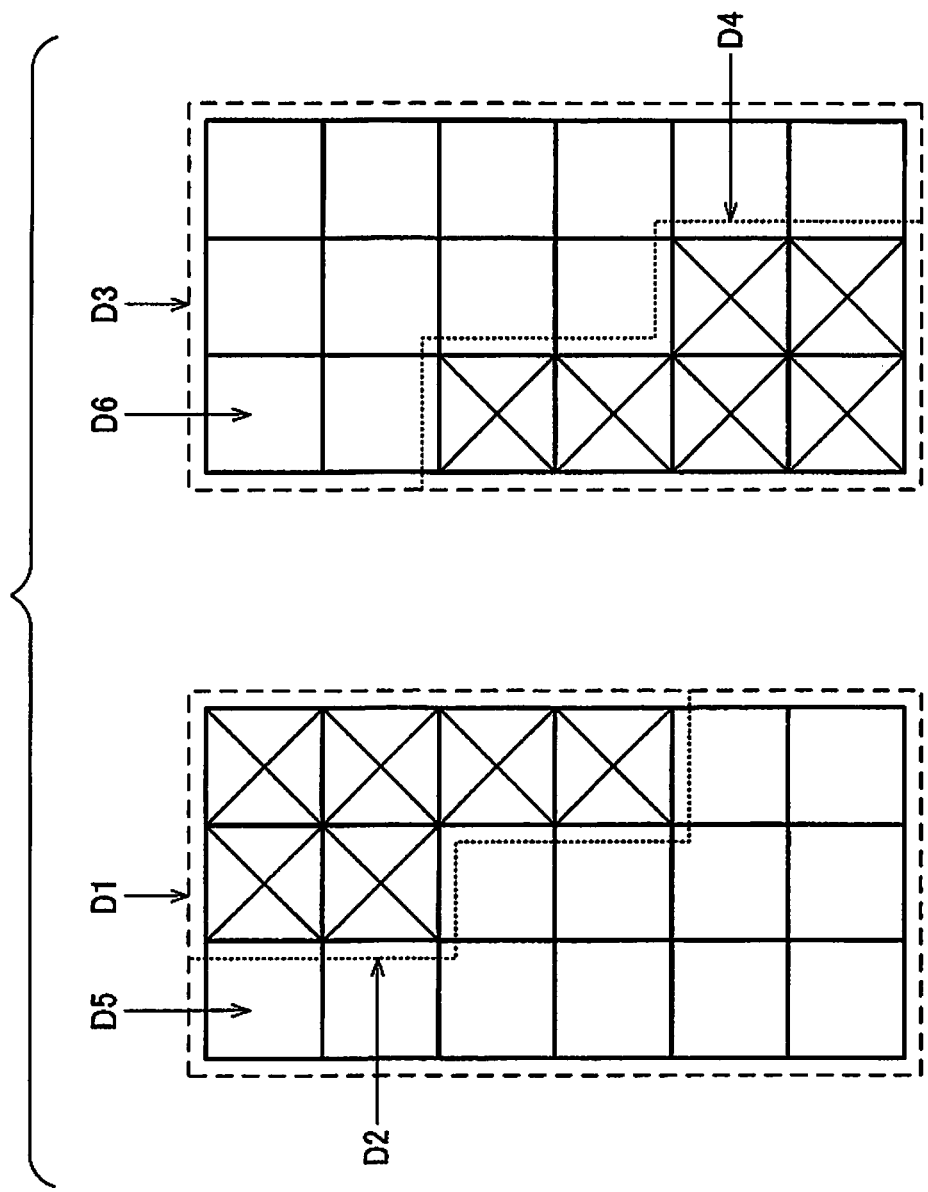
FIG. 24 is an example of setting the boundary in the comparative example.

FIG. 24 is a diagram describing the linking process for the trapezoidal shape and is a diagram representing the first merge image and the second merge image after the oblique motion correction process in units of pixels. In FIG. 24, only a small number of pixels are illustrated for simplification of description. In linking of the trapezoidal shape, for example, a buffer of the first processor 100 does not store an image of the trapezoidal shape itself and stores an image (D1) of an oblong shape circumscribed around the trapezoidal shape as the first merge image after the oblique motion correction process. In a range (D2) of the oblong shape outside the original trapezoidal shape, information that can identify the absence of a pixel value in the pixel in the range is stored. The same applies to the second merge image. An image (D3) of an oblong shape circumscribed around the trapezoidal shape is stored, and an area in which a pixel value is present is set to be identifiable from an area (D4) in which a pixel value is not present. Then, two oblong shapes (D1 and D3) are merged by performing positioning in the main scan direction. For example, two oblong shapes are caused to partially overlap such that the pixels of D5 are linked with the pixels of D6. In the overlap area between D1 and D3, a pixel value is present in one of D1 and D3, and a pixel value is not present in the other. Thus, the first processor 100 selects the pixel value on a side on which the pixel value is present as a pixel value in the overlap area.

As described above, the linking process for the trapezoidal shape can be implemented by expanding the linking process for the oblong shape. In addition, the linking process for the trapezoidal shape can be implemented using a method other than that described above. However, even in a case where any linking process is performed, the amount of data held in the buffer is increased, or a process that is not needed in linking of the oblong shape is added, compared to that in the linking process for the oblong shape.

In a case where the linking process of the first processor 100 is implemented by software, addition of the process is relatively easy, but an increase in the amount of stored data may be a concern. In addition, in a case where the linking process of the first processor 100 is implemented by a hardware circuit such as an ASIC, addition of the process itself may be difficult.

Considering the above point, the boundary BD is set in the present embodiment such that any of the first merge image after the oblique motion correction process and the second merge image after the oblique motion correction process is a rectangular area.

Figure 25:
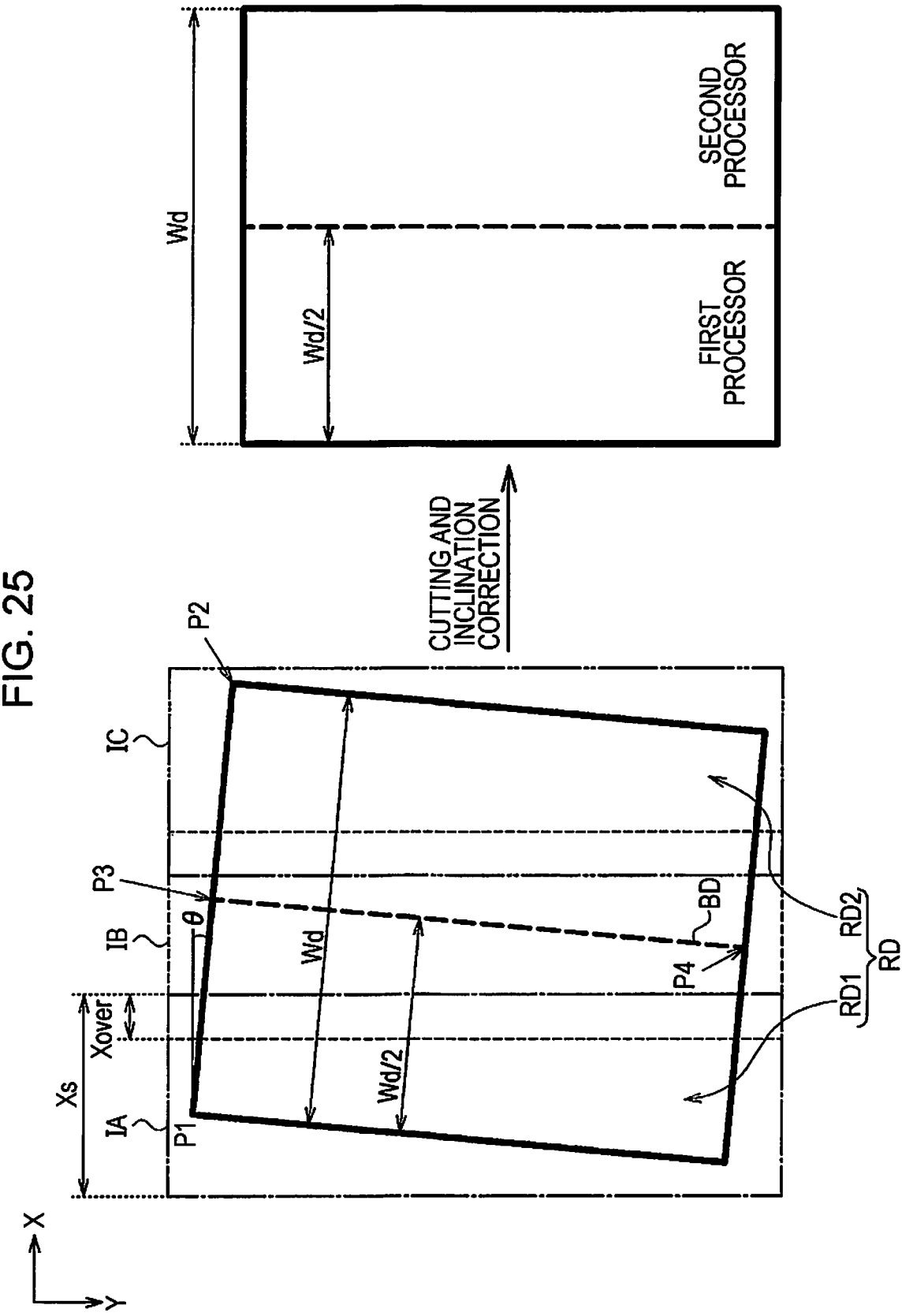
FIG. 25 is an example of setting a boundary in the embodiment.

FIG. 25 is a basic example of setting the boundary BD. The boundary BD is a line segment that is inclined by θ with respect to the subscan direction and has one end at the center between the first reference point P1 and the second reference point P2. In other words, the boundary BD is a line segment that divides the original document area RD in the vertical direction. Each of the first original document area RD1 and the second original document area RD2 set by BD has an oblong shape having a width (Wd/2) of half of the original document area RD. In the case of using the boundary BD illustrated in FIG. 25, the boundary BD between the first merge image and the second merge image after the oblique motion correction process is in a direction corresponding to the subscan direction. That is, regardless of the position in the subscan direction, the position of the boundary BD in the main scan direction is constant, and the linking process can be easily implemented in the same manner as the first embodiment.

However, in a case where the boundary BD is set under a condition such that the boundary BD is a line segment that is inclined by θ with respect to the subscan direction and has one end at the center between the first reference point P1 and the second reference point P2, the position of the boundary BD in the first image data to the third image data changes depending on the position of the original document area RD. In a case where the degree of oblique motion of the original document D is high, a part of the boundary BD may be significantly separated from the vicinity of the center of the second image data. A high degree of oblique motion is considered such that the inclination angle θ is large, or the original document D deviates to one side in the main scan direction.

Figure 26:
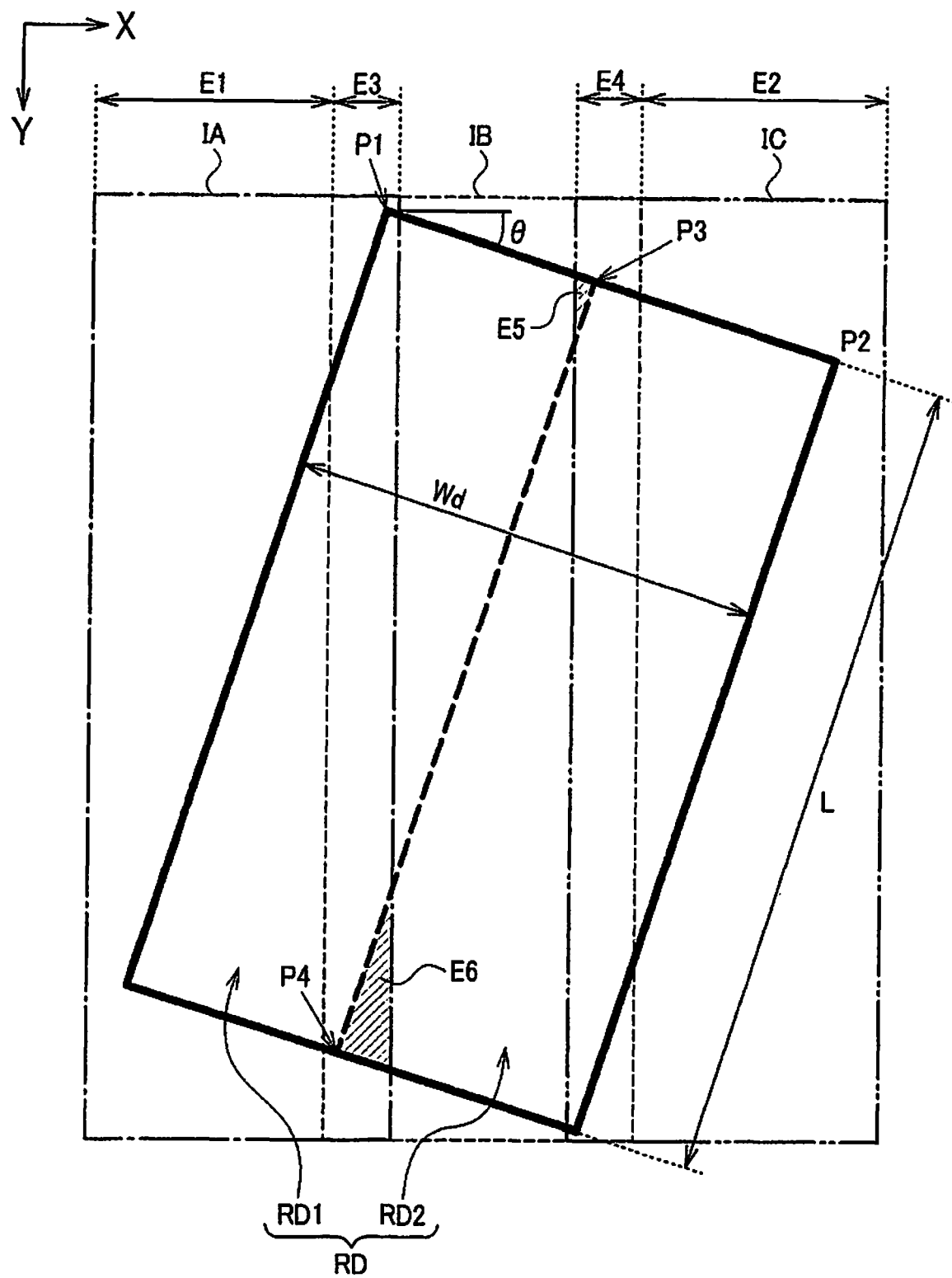
FIG. 26 is an example in which an appropriate boundary cannot be set due to a high degree of oblique motion.

FIG. 26 is a diagram describing the original document area RD and the boundary BD in a case where the degree of oblique motion is high. In FIG. 26, the inclination angle θ is higher than that in FIG. 25, and the boundary BD is significantly inclined with respect to the subscan direction. In FIG. 26, P3 moves in a rightward direction, and P4 moves in a leftward direction, compared to those in FIG. 25.

Several conditions that are to be satisfied by the boundary BD for appropriately generating the output image are considered. First, the boundary BD is not allowed to be outside the second area, that is, outside the range of the second image data. The outside of the range of the second image data corresponds to a range (E1) in which only the first image data is present, or a range (E2) in which only the third image data is present.

In a case where the boundary BD is present in E1, a part of the second original document area RD2 is included in E1. That is, the second processor 110 needs to generate the second merge image after oblique motion correction from the pixel value of the area illustrated by E1. However, since the first image data is not input into the second processor 110, a part of the second merge image after oblique motion correction cannot be generated. In addition, in a case where the boundary BD is present in E2, a part of the first original document area RD1 is included in E2. However, since the third image data is not input into the first processor 100, a part of the first merge image after oblique motion correction cannot be generated.

In a case where the boundary BD is included in the second area, a situation in which the image data is not present can be avoided. However, such a point is not sufficient for generating an appropriate output image. The reason is that in the second overlap area in which the second area and the third area overlap, both of the second image data and the third image data are needed in order to correct individual differences and the like between the image sensors.

In the example in FIG. 26, the boundary BD is included in E4 corresponding to the second overlap area. Thus, a part (E5) of the first original document area RD is included in E4. The first processor 100 acquires the second image data corresponding to E4 but does not acquire the third image data and thus, cannot execute the correction process. Consequently, the effect of individual differences and the like between the image sensor 42B and the image sensor 42C remains in an area corresponding to E5, and brightness or tone in the output image may be unnatural. The same applies to a case where the boundary BD is present in the first overlap area in which the first area and the second area overlap. In the example in FIG. 26, a part (E6) of the second original document area RD2 is included in an area (E3) corresponding to the first overlap area. That is, the second processor 110 that cannot acquire the first image data processes the first overlap area as a target, and the brightness or the tone of the output image may be unnatural.

Thus, based on the original document width information and the inclination angle information, the image reading apparatus 11 performs a process of setting the boundary BD between the first original document area RD1 that is a target of the cutting process and the inclination correction process of the first processor 100 in the original document area RD, and the second original document area RD2 that is a target of the cutting process and the inclination correction process of the second processor 110 in the original document area RD. In a case where it is determined that the set boundary BD is included in an area corresponding to the first area or the third area, it is determined that an oblique motion error occurs.

By doing so, it can be determined that the oblique motion error occurs in a case where the degree of oblique motion is high such that execution of the oblique motion correction process is difficult. In a case where it is determined that the oblique motion error occurs, the image reading apparatus 11 notifies the user of the oblique motion error using the display unit and the like and prompts the user to reset the original document D.

The image reading apparatus 11 may execute other processes at the time of the oblique motion error.

A specific oblique motion error determination is performed as follows. Hereinafter, an example in which the left side (image sensor 42A side) of the original document D protrudes in the transport direction Y will be described. A case where the right side (image sensor 42C side) of the original document D protrudes in the transport direction Y can be considered in the same manner by appropriately changing each expression. In the case of setting the coordinates of the first reference point P1 and the second reference point P2 as described above, the coordinate values (x3, y3) of one end of the boundary BD are represented by Expression (13). Thus, in the case of x3>xth3 with respect to a coordinate value xth3 of the end part of the third image data in the main scan direction, it is determined that the boundary BD is included in the third area.

$$(x3, y3) = \left(\frac{x1+x2}{2}, \frac{y1+y2}{2}\right) \quad (13)$$

In addition, the coordinate values (x4, y4) of the other end of the boundary BD are represented by Expression (14) using a length L of the original document. Thus, in the case of x4<xth1 with respect to a coordinate value xth1 of the end part of the first image data in the main scan direction, it is determined that the boundary BD is included in the first area.

$$(x4, y4) = (x3 - L \sin\theta, y3 + L \cos\theta) \quad (14)$$

The length L of the original document is not known until the reading process for the trailing edge of the original document is actually performed. However, in the case of continuing reading with a high degree of oblique motion, the original document D may interfere with a paper feeding port or the like and be damaged. That is, the oblique motion error is required to be determined in an early stage of reading. Thus, the image reading apparatus 11 estimates the length L of the original document using Expression (15). Here, β is the aspect ratio of the original document D and is, for example, equal to √2. By doing so, the length L of the original document can be estimated in the initial stage of reading, for example, a state in which Wd is obtained in S309. Thus, the oblique motion error can be determined early. For example, setting of the boundary BD and the oblique motion error determination are executed by the first processor 100 at the timing of S309 in FIG. 22A.

$$L = \beta \times Wd \quad (15)$$

3.3 Modification Example of Cutting Process and Inclination Correction Process

Several modifications can be made to the oblique motion correction process. For example, the image reading apparatus 11 may not fix the boundary BD at the center of the original document area RD and may set the boundary BD to be variable.

Figure 27:
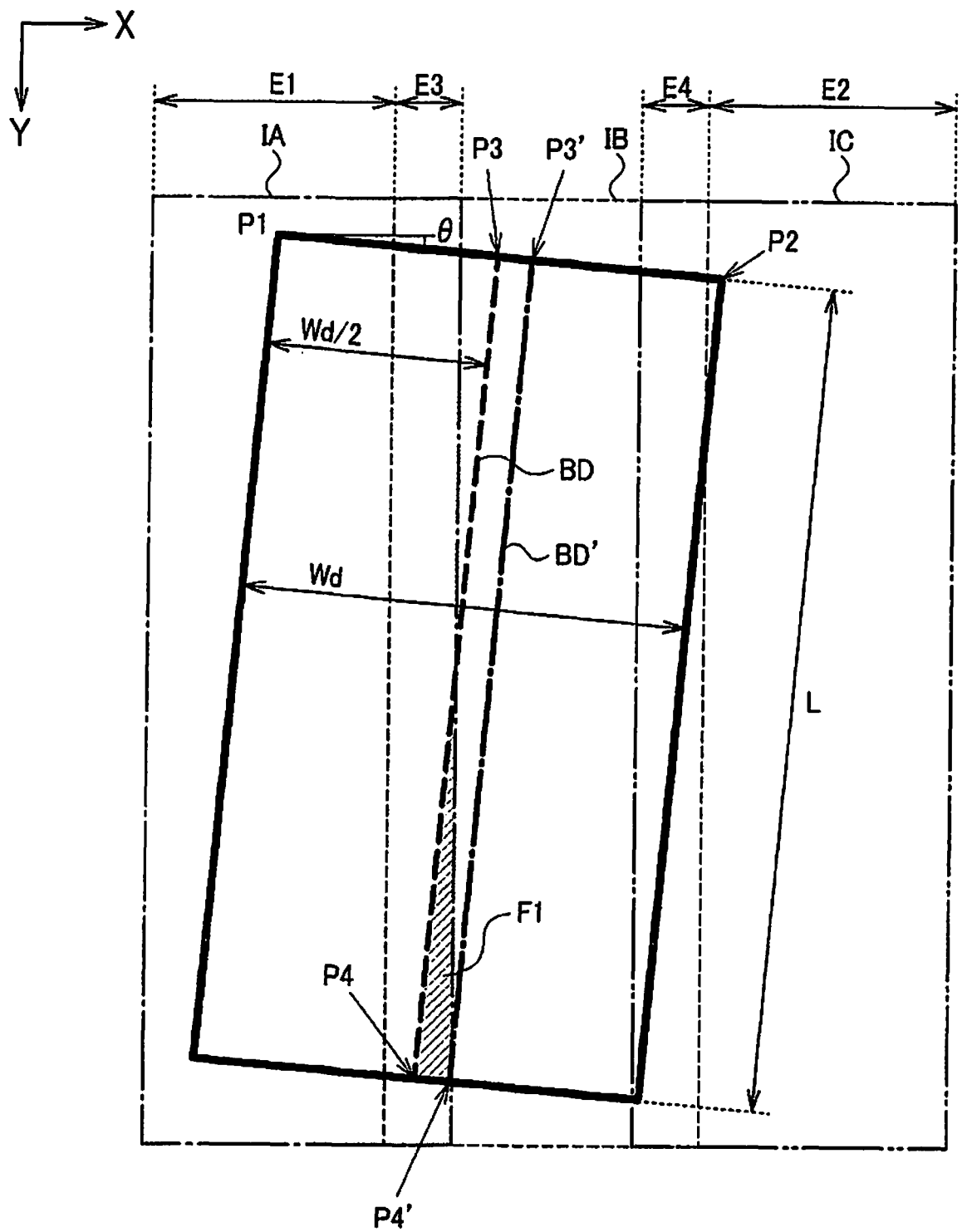
FIG. 27 is a diagram describing a boundary adjustment process.

FIG. 27 is a diagram describing a process of the present modification example. In FIG. 27, BD is an example of a boundary set at the center of the original document area RD. In FIG. 27, the original document D deviates to the image sensor 42A side in the main scan direction. Thus, the lower part of the boundary BD is included in the first area. Since a part (F1) of the second original document area RD2 is included in the first overlap area, the second processor 110 that does not acquire the first image data cannot appropriately calculate the pixel value of F1.

Meanwhile, in FIG. 27, the inclination angle θ is relatively small. Thus, the distance between the upper part of the boundary BD and the second overlap area is relatively and sufficiently long. Thus, the boundary BD is translated in the rightward direction. In FIG. 27, BD' denotes the boundary after translation. Accordingly, a state where the boundary BD' is not included in any of the first area and the third area can be implemented.

Specifically, the end point of the boundary BD is changed to P4' from P4. The coordinate value xth1 of P4' in the main scan direction is known, and the coordinate values (x4', y4') of P4' are obtained using Expression (16). In addition, the end point P3 of the boundary BD on the other side is changed to P3'. A vector from P3 toward P3' is equal to a vector (x4'-x4, y4'-y4) from P4 toward P4'. Thus, the coordinate values (x3', y3') of P3' are obtained using Expression (17).

$$(x4', y4') = (xth1, y4 + (xth1 - x4)\tan\theta) \quad (16)$$

$$(x3', y3') = (x3 + xth1 - x4, y3 + (xth1 - x4)\tan\theta) \quad (17)$$

In the case of x3'≤xth3, the boundary BD' is not included in the third area. Thus, it can be determined that an appropriate boundary is set in the same manner as the example in FIG. 27. By changing the boundary in such a manner, an appropriate oblique motion correction process can be implemented. In the case of x3'>xth3, it is determined that the boundary BD' is included in the third area. That is, it is determined that an appropriate oblique motion correction process cannot be executed even in a case where the position of the boundary BD is adjusted.

Figure 28:
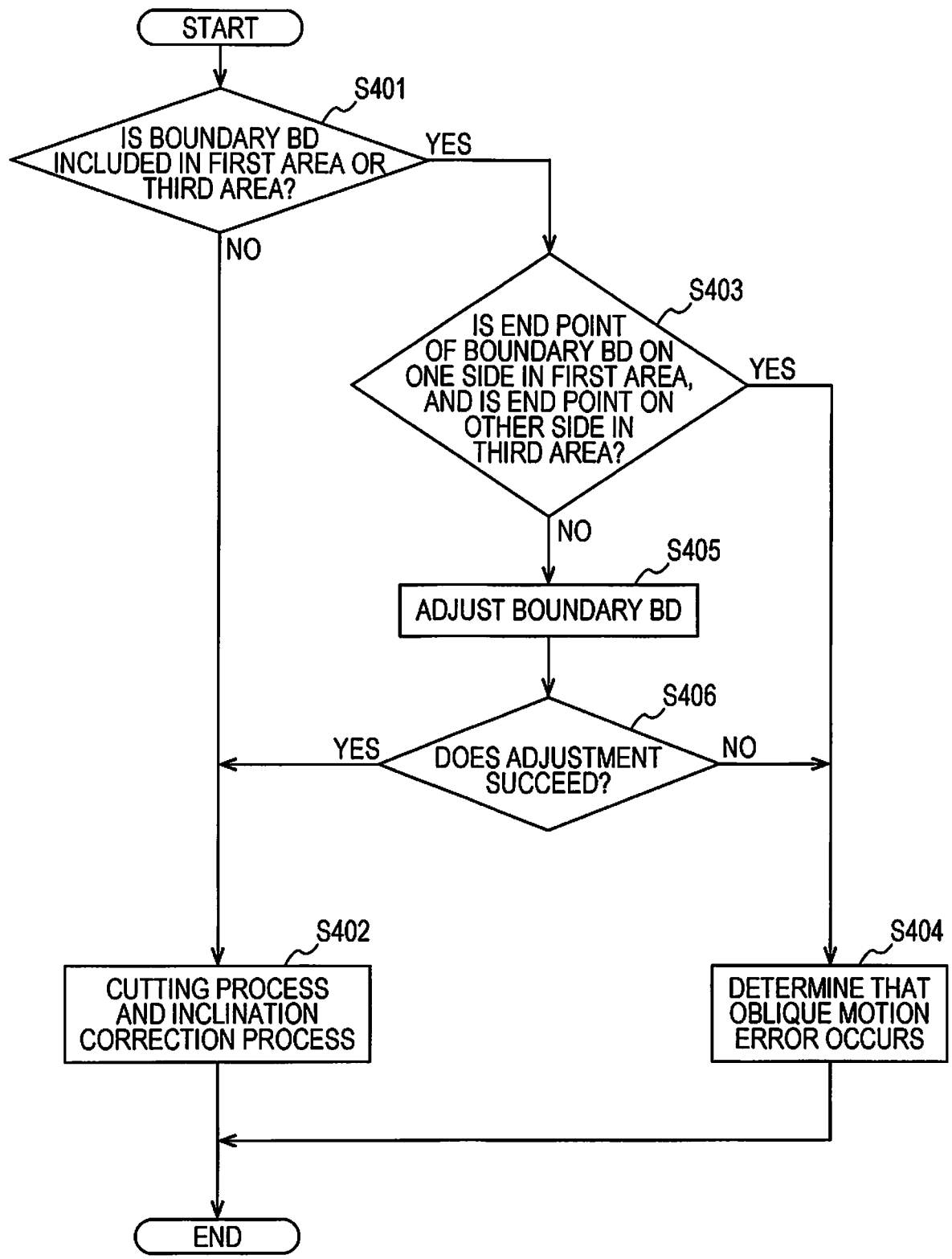
FIG. 28 is a flowchart describing the oblique motion correction process.

FIG. 28 is a flowchart describing a process related to the oblique motion correction process of the present modification example.

In a case where the process is started, first, a determination as to whether or not the boundary BD as a reference is included in any of the first area and the third area is performed (S401). The boundary BD as a reference is, for example, a boundary that is set at the center of the original document area RD. In the case of No in S401, an appropriate oblique motion correction process cannot be implemented using the boundary BD. Thus, a transition is made to the actual oblique motion correction process (S402). In a case where the process in FIG. 28 is executed in S309 in FIG. 22A, the process from S310 is started on the condition that a transition is made to S402, and the processes of S317A and S317B are executed. The process in FIG. 28 may be executed at other timings before the execution of S317A.

In the case of Yes in S401, a determination as to whether or not the end point of the boundary BD on one side is included in the first area, and the end point of the boundary BD on the other side is included in the third area is performed (S403). In the case of Yes in S403, the degree of oblique motion is high as illustrated in FIG. 26, and there is no room for adjusting the boundary BD. Thus, it is determined that the oblique motion error occurs (S404).

In the case of No in S403, adjustment of the boundary BD is tested (S405). For example, in a case where the end point of the boundary BD on one side is included in the first area, and the end point of the boundary BD on the other side is not included in the third area, the boundary BD is translated to the third area side. This case includes a case where both end points are included in the first area.

In addition, in a case where the end point of the boundary BD on one side is included in the third area, and the end point of the boundary BD on the other side is not included in the first area, the boundary BD is translated to the first area side.

After the process of S405, a determination as to whether or not the adjustment succeeds is performed (S406). Specifically, a determination as to whether or not the boundary BD is not included in any of the first area and the third area as a result of adjustment is performed. In the case of Yes in S406, a transition is made to the oblique motion correction process (S402). In the case of No, it is determined that the oblique motion error occurs (S404).

In addition, a modification can be made such that a condition for determining the oblique motion error is more strictly set. In a case where the merge process for the first image data and the second image data is performed based on the offset process described above using FIG. 12, a range from the end part of the second image data to Xmerge is the target of the offset process. As described above using FIG. 20, in the merge image, the range (C1) from the left end of the second image data to Xmerge is an area in which the pixel value is to be determined based on the first image data, and it is difficult to process the area by the second processor 110 into which the first image data is not input. Similarly, the range (C3) from the right end of the second image data to Xmerge is an area in which the pixel value is to be determined based on the third image data, and it is difficult to process the area by the first processor 100 into which the third image data is not input. That is, a range in which the presence of the boundary BD is allowed may be the area of the second image data excluding the correction target area Xmerge of the offset process from each end part. In the example in FIG. 20, it is determined that the oblique motion error occurs in a case where the boundary BD is present in at least one area of C1 and C3.

In addition, a part or most of the processes of the image reading apparatus 11, the first processor 100, the second processor 110, and the third processor 120 of the embodiment may be implemented by a program. In this case, the image reading apparatus 11 and the like of the embodiment are implemented by causing a processor such as a CPU to execute the program. Specifically, the program that is stored in a non-transitory information storage medium is read, and the processor such as a CPU executes the read program. The information storage medium that is a computer-readable medium stores the program, data, and the like. The function of the information storage medium can be implemented by an optical disc such as a DVD or a CD, an HDD, a memory, or the like. The processor such as a CPU performs various processes of the embodiment based on the program stored in the information storage medium. That is, the information storage medium stores the program for causing a computer to function as each unit of the embodiment.

In addition, the method of the embodiment can be applied to an image data generation method, a control method for the image reading apparatus 11, an operation method for the image reading apparatus 11, or an image processing method that executes a part or all of the steps illustrated in FIG. 12, FIG. 13, FIGS. 22A and 22B, and FIG. 28. The image data generation method according to the embodiment is an image data generation method using the above image reading apparatus 11 including the first sensor, the second sensor, and the third sensor and includes generating the first merge image including the first area and the second area based on the first image data acquired by reading by the first sensor and the second image data acquired by reading by the second sensor, generating the second merge image including the second area and the third area based on the second image data and the third image data acquired by reading by the third sensor, and generating image data of the output image by performing the merge process on the first merge image and the second merge image.

While the embodiment to which the invention is applied and the modification examples are described above, the invention is not limited to the embodiment and the modification examples and can be implemented in the stage of embodiment by modifying constituents without departing from the nature of the invention. For example, the order of processes can be rearranged without departing from the nature of the invention. In addition, a signal may be transmitted using optical communication using an optical fiber or may be transmitted using wireless communication. In addition, various inventions can be formed by appropriately combining a plurality of constituents disclosed in the embodiment and the modification examples. For example, several constituents may be removed from all constituents disclosed in the embodiment and the modification examples. Signal processing or image processing that is not disclosed in each embodiment or the modification example may be executed by any analog front end or any processor. By including the function of the analog front end in the processor, the output of the sensor chip may be directly input from the input interface of the processor. Furthermore, constituents described in different embodiments and modification examples may be appropriately combined. In addition, a term that is disclosed at least once along with a different term having a wider sense or the same sense in the specification or the drawings can be replaced with the different term at any location in the specification or the drawings. In such a manner, various modifications and applications can be made without departing from the gist of the invention. For example, in the case of reading the overscan area against the oblique motion, the image data from the image sensor including an image acquired by reading the color reference plate 43 in the overscan area may be acquired through the input interface, and the cutting process may be performed during the merge process. The first processor 100 may acquire only the image of the original document not including the image acquired by reading the color reference plate 43 from the second processor 110 as the merge image after merge.

The entire disclosure of Japanese Patent Application No. 2018-041552, filed Mar. 8, 2018 is incorporated by reference herein.

The entire disclosure of Japanese Patent Application No. 2018-190643, filed Oct. 9, 2018 is incorporated by reference herein.

What is claimed is:

1. An image reading apparatus comprising:
a first sensor that reads a first area of an image of a reading target;
a second sensor that reads a second area different from the first area in the image, the second area partially overlapping with the first area;
a third sensor that reads a third area different from the first area and the second area in the image, the third area partially overlapping with the second area in the image;
a first processor including a first input interface that acquires first image data by reading by the first sensor, and a second input interface that acquires second image data by reading by the second sensor, the first processor not including an input interface that acquires third image data by reading by the third sensor; and
a second processor including a third input interface that acquires the third image data by reading by the third sensor, and a fourth input interface that acquires the second image data by reading by the second sensor, the second processor not including an input interface that acquires the first image data by reading by the first sensor,
wherein the first processor performs a first merge process of merging the first image data and the second image data to generate a first merge image including the first area and the second area,
the second processor performs a second merge process of merging the second image data and the third image data to generate a second merge image including the second area and the third area, and
an output image is generated by performing a linking process on the first merge image and the second merge image.

2. The image reading apparatus according to claim 1, further comprising:
a first analog front end that performs A/D conversion on an analog signal from the first sensor and outputs the first image data which is digital data to the first processor;
a second analog front end that performs A/D conversion on an analog signal from the second sensor and outputs the second image data which is digital data to the first processor and the second processor; and
a third analog front end that performs A/D conversion on an analog signal from the third sensor and outputs the third image data which is digital data to the second processor.

3. The image reading apparatus according to claim 1,
wherein the first processor generates the first merge image by performing the first merge process of merging the first image data with the second image data based on a reading result acquired by the first sensor reading a first overlap area in which the first area and the second area overlap, and a reading result acquired by reading the first overlap area by the second sensor, and
the second processor generates the second merge image by performing the second merge process of merging the second image data with the third image data based on a reading result acquired by the second sensor reading a second overlap area in which the second area and the third area overlap, and a reading result acquired by reading the second overlap area by the third sensor.

4. The image reading apparatus according to claim 1,
wherein the first merge process includes a cutting process and an inclination correction process,
the second merge process includes the cutting process and the inclination correction process, and
the linking process does not include the cutting process and the inclination correction process.

5. The image reading apparatus according to claim 4,
wherein a detection process for an original document area that is an area in which an original document which is the reading target is read is performed based on an image into which an output of the first sensor, an output of the second sensor, and an output of the third sensor are merged,
detection of original document width information related to the reading target and detection of inclination angle information are performed based on the detected original document area, and
the cutting process and the inclination correction process included in the first merge process and the second merge process are performed based on the original document width information and the inclination angle information.

6. An image reading apparatus comprising:
a first sensor that reads a first area of an image of a reading target;
a second sensor that reads a second area partially overlapping with the first area in the image;
a third sensor that reads a third area partially overlapping with the second area in the image;
a first processor that performs a first merge process of generating a first merge image including the first area and the second area based on first image data acquired by reading by the first sensor and second image data acquired by reading by the second sensor; and
a second processor that performs a second merge process of generating a second merge image including the second area and the third area based on the second image data and third image data acquired by reading by the third sensor,
wherein an output image is generated by performing a linking process on the first merge image and the second merge image,
the first merge process includes a cutting process and an inclination correction process,
the second merge process includes the cutting process and the inclination correction process,
the linking process does not include the cutting process and the inclination correction process,
a detection process for an original document area that is an area in which an original document which is the reading target is read is performed based on an image into which an output of the first sensor, an output of the second sensor, and an output of the third sensor are merged, detection of original document width information related to the reading target and detection of inclination angle information are performed based on the detected original document area, and the cutting process and the inclination correction process included in the first merge process and the second merge process are performed based on the original document width information and the inclination angle information, a process of setting a boundary between a first original document area that is a target of the cutting process and the inclination correction process performed by the first processor in the original document area, and a second original document area that is a target of the cutting process and the inclination correction process performed by the second processor in the original document area is performed based on the original document width information and the inclination angle information, and a determination is made that an oblique motion error occurs in a case where a determination is made that the set boundary is included in an area corresponding to the first area or the third area.

7. The image reading apparatus according to claim 1, wherein the first processor acquires the second merge image from the second processor and generates the output image by performing the linking process based on the first merge image and the second merge image.

8. The image reading apparatus according to claim 1, further comprising:

a third processor that acquires the first merge image from the first processor, acquires the second merge image from the second processor, and generates the output image by performing the linking process based on the first merge image and the second merge image.

9. An image data generation method using an image reading apparatus including a first sensor that reads a first area of an image of a reading target, a second sensor that reads a second area different from the first area in the image, the second area partially overlapping with the first area, and a third sensor that reads a third area different from the first area and the second area in the image, the third area partially overlapping with the second area in the image, the method comprising:

inputting first image data by reading by the first sensor to a first input interface of a first processor and inputting second image data by reading by the second sensor to a second input interface of the first processor, and generating, by the first processor, a first merge image including the first area and the second area based on the first image data and the second image data;

inputting third image data by reading by the third sensor into a third input interface of a second processor and inputting the second image data by reading by the second sensor into a fourth input interface of the second processor, and generating, by the second processor, a second merge image including the second area and the third area based on the second image data and the third image data; and generating image data of an output image by performing a linking process on the first merge image and the second merge image.

* * * * *